United States Patent
Ekinaka et al.

(10) Patent No.: US 6,846,567 B1
(45) Date of Patent: Jan. 25, 2005

(54) SURFACE-PROTECTED TRANSPARENT PLASTIC COMPOSITE

(75) Inventors: Tatsuya Ekinaka, Chiyoda-ku (JP); Yoshihiko Imanaka, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 09/890,326

(22) PCT Filed: Jan. 31, 2000

(86) PCT No.: PCT/JP00/00515
§ 371 (c)(1),
(2), (4) Date: Jul. 30, 2001

(87) PCT Pub. No.: WO00/46024
PCT Pub. Date: Aug. 10, 2000

(30) Foreign Application Priority Data

Feb. 1, 1999 (JP) ............................................. 11-024079
May 11, 1999 (JP) ............................................. 11-129942

(51) Int. Cl.$^7$ ............................................... B32B 25/20
(52) U.S. Cl. ........................ 428/447; 428/412; 428/451; 428/500; 428/39; 524/847; 524/560; 524/336; 524/356; 524/91; 524/100; 525/100; 525/186; 525/497
(58) Field of Search ............................... 428/412, 447, 428/451, 500; 528/39; 524/847, 560, 336, 356, 91, 100; 525/100, 186, 497

(56) References Cited

U.S. PATENT DOCUMENTS

| | | | |
|---|---|---|---|
| 3,986,997 A | | 10/1976 | Clark |
| 4,027,073 A | | 5/1977 | Clark |
| 4,708,908 A | * | 11/1987 | Tateoka et al. |
| 5,385,955 A | | 1/1995 | Tarshiani |
| 5,725,960 A | * | 3/1998 | Konishi et al. |

FOREIGN PATENT DOCUMENTS

| | | |
|---|---|---|
| JP | 48-26822 | 9/1973 |
| JP | 51-2736 | 10/1976 |
| JP | 59-109528 | 6/1984 |
| JP | 61-86259 | 1/1986 |
| JP | 63-278979 | 11/1988 |
| JP | 01-306476 | 12/1989 |
| JP | 05-287095 | 11/1993 |
| JP | 09-011405 | 1/1997 |
| WO | WO 80-00940 | 5/1980 |

\* cited by examiner

Primary Examiner—Kuo-Liang Peng
(74) Attorney, Agent, or Firm—Wenderoth, Lind & Ponack, L.L.P.

(57) ABSTRACT

A surface-protected plastic composite material comprising a transparent plastic, a coating layer (I) as a first layer stacked on the transparent plastic and a thermally cured coating layer (II) as a second layer stacked on the first layer, the coating layer (I) being formed of a resin composition containing at least 50% by weight, based on the resin content thereof, of an acrylic resin which is an acrylic resin containing at least 50 mol % of recurring unit based on an alkyl methacrylate, the thermally cured coating layer (II) being made of an organosiloxane resin formed from the following components a, b and c, (A) colloidal silica (component a),
(B) a hydrolysis condensate (component b) of a trialkoxysilane,
(C) a hydrolysis condensate (component c) of a tetraalkoxysilane,
  the organosiloxane resin containing 5 to 45% by weight of the component a, 50 to 80% by weight of the component b and 2 to 30% by weight of the component c, and use of the composite material as a window glass.

The present invention provides a transparent plastic composite material that is remarkably improved in abrasion resistance and anti-peeling properties.

26 Claims, No Drawings

SURFACE-PROTECTED TRANSPARENT PLASTIC COMPOSITE

DETAILED DESCRIPTION OF THE INVENTION

1. Field of the Invention

The present invention relates to a surface-protected transparent plastic composite material. More specifically, it relates to a transparent plastic composite material which comprises a layer made mainly of an acrylic resin and a cured product layer of an organosiloxane resin that are consecutively laminated on a transparent plastic substrate and which is remarkably improved in abrasion resistance and peel resistance.

2. Prior Art of the Invention

Plastic materials are widely used in various fields owing to characteristic features such as impact resistance, lightweight properties and processability. Above all, an acrylic resin, a polycarbonate resin, a styrene resin, etc. that are transparent plastics are widely used as a substitute for glass. However, these resins have a defect that they are poor in abrasion resistance, liable to suffer scratching on a surface and liable to be eroded with a solvent.

In recent years, there is a tendency to apply a transparent plastic sheet to a window glass, particularly, an automobile window glass, as an organic glass while utilizing the lightweight properties and safety thereof. When a transparent plastic sheet is applied to such a use, for example, a windshield, it is required to prevent the occurrence of scratching caused during the operation of a wiper, and when it is applied to a side window, it is required to prevent the occurrence of scratching during the elevating of the window up and down. For such applications, the transparent plastic sheet is required to have high-level abrasion resistance equivalent to that of glass.

Further, automobile window glasses are exposed to various environments outdoors for a long time, and they are required to satisfy such high-level abrasion resistance and weatherability as those of glass.

For overcoming the above drawbacks, there have been already made a variety of proposals to improve a plastic substrate in abrasion resistance by forming an adhesive layer on the plastic substrate as required and coating the surface thereof with a cured coating of a siloxane. For example, JP-A-51-2736 and JP-A-55-94971 describe a coating composition comprising a trihydroxysilane partial condensate and colloidal silica. Further, JP-A-48-26822 and JP-A-51-33128 describe a coating composition comprising, as a main component, a partial condensate of an alkyltrialkoxysilane and a tetraalkoxysilane. When a laminate is obtained by coating a transparent plastic substrate with the coating composition comprising a trihydroxysilane partial condensate and colloidal silica or the coating composition comprising, as a main component, a partial condensate of an alkyltrialkoxysilane and a tetraalkoxysilane to form a cured coating film, the laminate has good abrasion resistance to some extent. When it is applied to the field of an automobile window glass, however, the abrasion resistance thereof is not satisfactory, and it is demanded to improve the above coating compositions further in abrasion resistance.

Further, JP-A-63-278979 and JP-A-1-306476 describe a coating composition prepared by adding colloidal silica to a condensate of an alkyltrialkoxysilane and a tetraalkoxysilane. However, the above coating composition has been developed mainly for surface protection of inorganic materials such as natural marble and metals, and it does not ensure the formation of a protective layer having good adhesion on a plastic substrate. When the coating composition disclosed in the above patent publications was actually used to form a coating on a polycarbonate resin through an adhesive layer, a coating layer underwent cracking during the curing thereof under heat or no sufficient abrasion resistance was attained, since the amount ratio of the colloidal silica, trialkoxysilane and tetraalkoxysilane had not been fully studied for formation of a protective layer on a plastic. Further, even if some compositions are free from the occurrence of cracking and attains sufficient abrasion resistance, a coating formed thereof has a problem that the coating layer undergoes cracking since it undergoes a complete curing reaction when re-heated or immersed in boiling water and since the thermal expansion coefficient of a plastic substrate and the counterpart of the coating layer differs. It has been therefore demanded to further improve the above composition for applying it to a plastic substrate.

In a coated plastic molded material formed by coating a polycarbonate resin substrate surface with an adhesive layer (primer layer) and a cured siloxane resin coating film, further, it has been proposed in many ways to incorporate an ultraviolet absorbent into the adhesive layer so that the coated plastic molded material is improved in weatherability. For example, such proposals are made in JP-A-61-86259, JP-A-2-16048, JP-A-2-16129, JP-A-4-106161 and JP-A-5-255526.

The weatherability is improved by incorporating an ultraviolet absorbent into the adhesive layer as described above. However, some ultraviolet absorbents bleed into a top layer coating liquid during formation of a top layer coating. As a result, the top coating layer may decrease in abrasion resistance, or an incorporated ultraviolet absorbent may bleed out during exposure outdoors for a long time, so that there may be caused a problem that a coating film peels or that the polycarbonate resin molded material undergoes yellowing.

It is therefore necessary to be careful in selecting an ultraviolet absorbent.

Problems to be Solved by the Invention

It is a first object of the present invention to provide a transparent plastic composite material that is surface-protected with a cured coating film having unconventional high-level abrasion resistance.

It is a second object of the present invention to provide a transparent plastic composite material that is free from cracking of a cured coating layer under environmental conditions during outdoor exposure and that is free from bleeding-out of an ultraviolet absorbent.

It is a third object of the present invention to provide a transparent plastic composite material comprising a transparent plastic substrate and a coating layer, in which the coating layer formed on the transparent plastic substrate does not peel, and the transparent plastic substrate is almost free of yellowing and deterioration, during use for a long period of time.

It is another object of the present invention to provide a transparent plastic composite material that is light in weight, can be used for a long period of time without losing its transparency and is therefore suitable for a window glass in transportation machines and equipment for which a decrease in weight is demanded, such as automobiles, train cars, aircrafts, and the like.

For achieving the above objects of the present invention, the present inventors have accordingly made diligent studies. As a result, it has been found that a composite material formed by stacking an acrylic resin coating layer (first layer) having a specific composition on a transparent plastic substrate surface and stacking an organosiloxane resin cured layer (second layer) having a specific composition on the surface of the above coating layer has surface properties including an unconventional high-level abrasion resistance, is excellent in peel resistance and remarkably free from cracking under environmental conditions during outdoor exposure, retains transparency during use for a long period of time and is almost free from yellowing and deterioration against ultraviolet light. The present invention has been accordingly arrived at.

Means to Solve the Problems

That is, according to the present invention, there is provided a surface-protected plastic composite material comprising a transparent plastic, a coating layer (I) as a first layer stacked on the transparent plastic substrate and a thermally cured coating layer (II) as a second layer stacked on the first layer, the coating layer (I) being formed of a resin composition containing at least 50% by weight, based on the resin content thereof, of an acrylic resin which is an acrylic resin containing at least 50 molt of recurring unit of the following formula (I-a),

wherein $R^1$ is an alkyl group having 1 to 4 carbon atoms, the thermally cured coating layer (II) being made of an organosiloxane resin formed from the following components a, b and c, (A) colloidal silica (component a),
(B) a hydrolysis condensate (component b) of a trialkoxysilane of the following formula (II-1),

wherein $R^2$ is an alkyl group having 1 to 4 carbon atoms, a vinyl group or an alkyl group which has 1 to 3 carbon atoms and is substituted with at least one group selected from the class consisting of methacryloxy, amino, glycidoxy and 3,4-epoxycyclohexyl and $R^3$ is an alkyl group having 1 to 4 carbon atoms, and (C) a hydrolysis condensate (component c) of a tetraalkoxysilane of the following formula (II-2),

wherein $R^4$ is an alkyl group having 1 to 4 carbon atoms, the organosiloxane resin containing 5 to 45% by weight of the component a, 50 to 80% by weight, as $R^2SiO_{3/2}$, of the component b and 2 to 30% by weight, as $SiO_2$, of the component c.

The transparent plastic composite material of the present invention will be explained more in detail hereinafter.

To explain the transparent plastic composite material of the present invention simply, it is constituted of a transparent plastic substrate, a coating layer (first layer) made of a specific acrylic resin and formed on the surface thereof and a cured coating layer (second layer) made of a specific organosiloxane resin composition and formed on the surface of the first layer. The first layer and the second layer may be formed on one surface, or they may be formed on both the surfaces of the transparent plastic substrate.

In the present specification, the transparent plastic substrate, the coating layer (first layer) and the cured coating layer (second layer) constituting the transparent plastic composite material will be specifically explained in detail in the order of the transparent plastic substrate, the coating layer (first layer) and the cured coating layer (second layer).

The transparent plastic substrate for constituting the transparent plastic composite material of the present invention is a transparent plastic molded material having the form of a film, a sheet or a board. The term "transparent" means that the plastic molded material has a haze value of 10% or less, preferably 8% or less, in terms of a transparency. The transparent plastic substrate has a thickness of 0.001 to 10 mm, preferably 0.02 to 8 mm, and when the plastic forming the transparent plastic substrate is an aromatic polycarbonate resin, a transparent plastic substrate having a thickness of 0.1 to 8 mm is used. The above thickness is not necessarily required to be uniform, and the transparent plastic substrate may have a moderate change in thickness.

The plastic forming the transparent plastic substrate may be any plastic so long as it has the above transparency and the above form. Specifically, the plastic includes (a) an aromatic polycarbonate resin; (b) acrylic resins such as polymethyl methacrylate; (c) polyester resins such as polyethylene terephthalate, polybutylene terephthalate and poly (ethylene-2,6-naphthalate); (d) polystyrene; (e) polypropylene; (f) polyarylate; and (g) polyether sulfone. In view of usefulness as a substrate having adhesion to the first layer and having excellent abrasion resistance, (a) a polycarbonate resin and (b) acrylic resins such as polymethyl methacrylate are preferred, and (a) a polycarbonate resin is particularly preferred.

The aromatic polycarbonate resin suitable for the transparent plastic substrate will be explained below.

The polycarbonate resin for use is generally obtained from a dihydric phenol and a carbonate precursor by an interfacial polycondensation method or a melt polymerization method. Typical examples of the dihydric phenol used in this case include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (generally called "bisphenol A"), 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, 4,4'-dihydroxydiphenyl sulfoxide, 4,4'-dihydroxydiphenyl sulfide, 4,4'-dihydroxydiphenyl ketone, 4,4'-dihdyroxydiphenyl ether and 4,4'-dihydroxydiphenyl ester. Of these, 2,2-bis(4-hydroxyphenyl)alkanes are preferred, and bisphenol A is particularly preferred. The above dihydric phenols may be used alone or in combination.

The carbonate precursor is selected from carbonyl halides, carbonate esters or haloformates, and specific examples thereof include phosgene, diphenyl carbonate and dihaloformate of a dihydric phenol.

When the above dihydric phenol and the carbonate precursor are allowed to react by an interfacial polycondensation method or a melt polymerization method to produce a polycarbonate resin, a catalyst, a terminal stopper and an antioxidant for the dihydric phenol may be used as required. Further, the polycarbonate resin may be a branched polycarbonate resin formed by copolymerization of trifunctional or higher polyfunctional aromatic compounds or may be a polyester carbonate resin formed by copolymerization of aromatic or aliphatic difunctional carboxylic acids, and it may be also a mixture of two or more of obtained polycarbonate resins.

The reaction by an interfacial polycondensation method is generally a reaction between a dihydric phenol and phosgene, and the reaction is carried out in the presence of an acid binder and an organic solvent. The acid binder is selected, for example, from alkali metal hydroxides such as sodium hydroxide and potassium hydroxide or amine compounds such as pyridine. The organic solvent is selected, for example, from halogenated hydrocarbons such as methylene chloride and chlorobenzene. For promoting the reaction, there may be used a catalyst that is selected, for example, from tertiary amines such as triethylamine, tetra-n-butylammonium bromide and tetra-n-butylphosphonium bromide, quaternary ammonium compounds or quaternary phosphonium compounds. In this case, preferably, the reaction temperature is generally 0 to 40° C., the reaction time period is approximately 10 minutes to 5 hours, and the pH during the reaction is maintained at 9 or more.

In the above interfacial polymerization method, generally, a terminal stopper is used. The terminal stopper is selected from monofunctional phenols. Monofunctional phenols are generally used as a terminal stopper for adjusting molecular weights, and an obtained polycarbonate resin has terminals blocked with groups from the monofunctional phenols, so that the polycarbonate resin has excellent thermal stability over any other resin. Examples of the above monofunctional phenols include phenol, p-tert-butylphenol, p-cumylphenol and isooctylphenol. Of these, p-tert-butylphenol is preferred.

The reaction by a melt polymerization method is generally an ester exchange reaction between a dihydric phenol and a carbonate ester, and the reaction is carried out by a method in which a dihydric phenol and a carbonate ester are mixed under heat in the presence of an inert gas and an alcohol or a phenol being formed is distilled off. Although differing depending upon the boiling point of the formed alcohol or phenol or the like, the reaction temperature is generally in the range of from 120° C. to 350° C. At a later stage of the reaction, the pressure in the reaction system is reduced approximately to 1,300 Pa to 13 Pa (10 to 0.1 Torr) to easily distill the formed alcohol or phenol off. The reaction time period is generally approximately 1 to 4 hours.

The obtained polycarbonate resin preferably has a specific viscosity in the range of 0.25 to 0.6, preferably 0.3 to 0.55 when 0.7 g of the polymer thereof is dissolved in 100 ml of methylene chloride and measured for a specific viscosity at 20° C. A polycarbonate resin substrate having a desired thickness, used in the present invention, can be obtained by a method in which the polycarbonate resin obtained by the above production method is molded by a method for producing a general film or sheet, for example, by a melt extrusion method using a T-die extruder.

In the transparent plastic composite material of the present invention, as a first layer, the coating layer (I) formed of a resin composition containing at least 50% by weight, based on the resin content thereof, of an acrylic resin is stacked on the surface of the above transparent plastic substrate. The coating layer (I) is interposed between the transparent plastic substrate and the thermally cured coating layer (II) and works to strongly bond these two elements.

The acrylic resin as a main component of the coating layer (I) as a first layer is a polymer containing at least 50 molt, based on the total of recurring units, of recurring units of the following formula (I-a),

wherein $R^1$ is an alkyl group having 1 to 4 carbon atoms.

The above acrylic resin preferably contains at least 60 molt of recurring units of the above formula (I-a), and more preferably contains at least 70 molt thereof. An acrylic resin containing less than 50 molt of recurring units of the above formula (I-a) is undesirable since it is poor in adhesion between the transparent plastic substrate and the thermally cured coating layer (II) as a second layer.

The above acrylic resin is a polymer obtained by polymerizing at least 50 mol % of an alkyl methacrylate monomer and not more than 50 mol % of a vinyl monomer. The alkyl methacrylate monomer specifically includes methyl methacrylate, ethyl methacrylate, propyl methacrylate and butyl methacrylate, and these monomers may be used alone or in combination. Of these, methyl methacrylate and ethyl methacrylate are preferred, and methyl methacrylate in particular is excellent.

The other vinyl monomer is a monomer copolymerizable with the alkyl methacrylate monomer, and it is preferably selected from acrylic acid, methacrylic acid or derivatives of these in view of adhesion or durability such as weatherability. Specifically, the vinyl monomer includes acrylic acid, methacrylic acid, acrylic acid amide, methacrylic acid amide, methyl acrylate, ethyl acrylate, propyl acrylate, butyl acrylate, 2-ethylhexyl methacrylate, dodecyl methacrylate, 2-hydroxyethyl acrylate, 2-hydroxyethyl methacrylate, 2-hydroxypropyl methacrylate, N,N-diethylaminoethyl methacrylate, glycidyl methacrylate, 3-methacryloxypropyltrimethoxysilane, 3-methacryloxypropyltriethoxysilane and 3-methacryloxypropylmethyldimethoxysilane. These monomers may be used alone or in combination. Further, the acrylic resin may be a mixture of acrylic resins.

The above acrylic resin is preferably a thermosetting resin, and for this reason, the acrylic resin desirably contains at least 0.01 mol % but less than 50 mol % of a vinyl monomer having a crosslinking reactive group. The vinyl monomer having a crosslinking reactive group includes acrylic acid, methacrylic acid, 2-hydroxyethyl acrylate, 2-hydroxyethyl methacrylate, 2-hydroxypropyl methacrylate, vinyltrimethoxysilane, 3-methacryloxypropyltrimethoxysilane, 3-methacryloxypropyltriethoxysilane and 3-methacryloxypropylmethyldimethoxysilane.

The molecular weight of the above acrylic resin is preferably 20,000 to 600,000, more preferably 50,000 to 400,000 in terms of a weight average molecular weight. The above acrylic resin having a molecular weight in the above range is preferred since it fully exhibits performances of adhesion and strength as a first layer.

In the present invention, the coating layer (I) stacked on the surface of the transparent plastic substrate is formed of a resin composition containing at least 50% by weight of the above acrylic resin. The content of the above acrylic resin in the resin composition is preferably at least 60% by weight.

In the present invention, the acrylic resin for forming the coating layer (I) to be stacked on the surface of the transparent plastic substrate can be a acrylic copolymer resin to be described later. The acrylic copolymer resin is a preferred embodiment as an acrylic resin for forming the coating layer (I).

That is, the acrylic copolymer resin is an acrylic copolymer resin having recurring units of the above formula (I-a)

and the following formula (I-b) and/or the following formula (I-c),

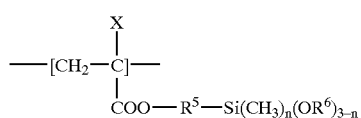   (I-b)

wherein X is a hydrogen atom or methyl, $R^5$ is an alkylene group having 2 to 5 carbon atoms, $R^6$ is an alkyl group having 1 to 4 carbon atoms and n is an integer of 0 or 1,

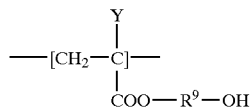   (I-c)

wherein Y is a hydrogen atom or methyl and $R^9$ is an alkylene group having 2 to 5 carbon atoms.

The above acrylic copolymer resin has a (I-a):[(I-b)+(I-c)] molar ratio of the units in the range of from 99.5:0.5 to 50:50.

In the above acrylic copolymer resin, the (I-a):[(I-b)+(I-c)] molar ratio of the units is preferably in the range of from 99:1 to 60:40, more preferably from 97:3 to 70:30.

The above acrylic copolymer resin can be obtained by copolymerizing the above alkyl methacrylate monomer together with an acrylate (or methacrylate) monomer having an alkoxysilyl group and/or an acrylate (or methacryalte) monomer having a hydroxy group as comonomer(s). The acrylate (or methacrylate) monomer having an alkoxysilyl group, which gives the recurring units of the above formula (I-b), specifically includes 3-methacryloxypropyltrimethoxysilane, 3-acryloxypropyltrimethoxysilane, 3-methacryloxypropyltriethoxysilane, 3-acryloxypropyltriethoxysilane, 3-methacryloxypropylmethyldimethoxysilane and 3-acryloxypropylmethyldimethoxysilane. Preferred are 3-methacryloxypropyltrimethoxysilane, 3-methacryloxypropyltriethoxysilane and 3-methacryloxypropylmethyldimethoxysilane, and 3-methacryloxypropyltrimethoxysilane is particularly preferred.

When the acrylic copolymer resin obtained by copolymerization of the acrylate (or methacrylate) monomer having an alkoxysilyl group and the alkyl methacrylate monomer is used, the adhesion to the organosiloxane resin thermally cured layer as a second layer is improved, the transparent plastic composite material is further improved in durability against hot water, and the copolymer obtained by copolymerization in the above amount ratio does not easily undergo gelling, so that it has an excellent shelf life. It is assumed that the above acrylic copolymer resin is structurally similar to the second layer and has affinity thereto since it has an alkoxysilyl group, and that the adhesion thereof to the second layer is hence more improved.

The acrylate (or methacrylate) monomer having a hydroxy group, which gives recurring units of the above formula (I-c), specifically includes 2-hydroxyethyl acrylate, 2-hydroxyethyl methacrylate, 2-hydroxypropyl acrylate and 2-hydroxypropyl methacrylate. Of these, 2-hydroxyethyl methacrylate is preferred.

Other preferred embodiment of the acrylic copolymer resin will be explained below. The "other embodiment" is that the above acrylic copolymer resin is a resin formed by copolymerization of an acrylate (or methacrylate) further having an ultraviolet absorbent residue.

That is, the acrylic copolymer resin as other embodiment is an acrylic copolymer resin containing 0.3 to 40 mol %, based on the total units of the above formulae (I-a) and [(I-b)+(I-c)], of units of the following formula (I-d),

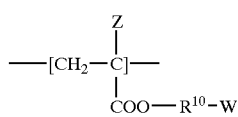   (I-d)

wherein Z is a hydrogen atom or methyl, $R^{10}$ is an alkylene group having 2 to 5 carbon atoms and W is an ultraviolet absorbent residue.

The content of the acrylate (or methacrylate) units having an ultraviolet absorbent residue of the above formula (I-d), based on the total units of the the above formulae (I-a) and [(I-b)+(I-c)], is 0.3 to 40 mol %, preferably 0.5 to 30 mol %.

The above ultraviolet absorbent residue refers to a derivative group that works as an ultraviolet absorbent, and it refers to an ultraviolet absorbent group that is ester-bonded to a carboxyl group of the acrylate (or methacrylate) through the group $R^{10}$ in the above formula (I-d).

The acrylate (or methacrylate) monomer having an ultraviolet absorbent residue, which gives recurring units of the above formula (I-d), specifically includes 2-(2'-hydroxy-5'-methacryloxyethylphenyl)benzotriazole, 2-(2'-hydroxy-5'-methacryloxyethoxyphenyl)benzotriazole, 2-(2'-hydroxy-5'-methacryloxypropylphenyl)benzotriazole, 2-(2'-hydroxy-5'-methacryloxypropoxyphenyl)-benzotriazole, 2-(2'-hydroxy-5'-methacryloxyethylphenyl)-5-chlorobenzotriazole, 2-(2'-hydroxy-3'-methacryloxyethyl-5'-t-butylphenyl) benzotrizaole, 2-(2'-hydroxy-3'-methacryloxyethyl-5'-t-butylphenyl)-5-chlorobenzotriazole, 2-hydroxy-4-(methacryloxyethoxy)benzophenone, 2-hydroxy-4-(methacryloxypropoxy)benzophenone, 2,2'-dihydroxy-4-(methacryloxyethoxy)benzophenone and 2-hydroxy-4-(methacryloyloxyethyl)benzophenone.

The acrylic copolymer resin containing recurring units of the above formula (I-d) is used as a resin component of the coating layer (I), there can be obtained a transparent plastic composite material having excellent weatherability. Further, when an ultraviolet absorbent is incorporated into the acrylic resin component for the coating layer (I), the amount thereof can be decreased. That is, when a large amount of an ultraviolet absorbent is incorporated into an acrylic resin, the ultraviolet absorbent may bleed out, and such a drawback can be decreased.

The acrylic resin in the coating layer (I) in the present invention may contain a hydrolysis condensate of an alkoxysilane. That is, the coating layer (I) may be a layer formed of a mixture of the above acrylic resin with a hydrolysis condensate of an alkoxysilane of the following formula (I-e) in which the acrylic resin: hydrolysis condensate amount ratio by weight is in the range of from 99:1 to 60:40, preferably from 97:3 to 70:30. The above amount ratio is expressed by taking the amount of the hydrolysis condensate as $R^7_r$—$SiO_{4-r/2}$.

$$R^7_r\text{—Si}(OR^8)_{4-r} \qquad \text{(I-e)}$$

wherein $R^7$ is an alkyl group having 1 to 4 carbon atoms, a vinyl group or an alkyl group which is substituted with one or more groups selected from the class consisting of methacryloxy, amino, glycidoxy and 3,4-epoxycyclohexyl and has 1 to 3 carbon atoms, $R^8$ is an alkyl group having 1 to 4 carbon atoms, and r is an integer of 0 to 2.

Examples of the alkoxysilane of the above formula (I-e) include tetramethoxysilane, tetraethoxysilane, tetra-n-propoxysilane, tetraisopropoxysilane, tetra-n-butoxysilane, tetraisobutoxysilane, methyltrimethoxysilane, methyltriethoxysilane, ethyltrimethoxysilane, isobutyltrimethoxysilane, vinyltrimethoxysilane, vinyltriethoxysilane, γ-methacryloxypropyltrimethoxysilane, β-(3,4-epoxycyclohexyl)ethyltrimethoxysilane, γ-glycidoxypropyltrimethoxysilane, γ-aminopropyltrimethoxysilane, γ-aminopropyltriethoxysilane, N-β(aminoethyl)-γ-aminopropyltrimethoxysilane, N-β(aminoethyl)-γ-aminopropyltriethoxysilane, dimethyldimethoxysilane, vinylmethyldimethoxysilane, 3-methacryloxypropylmethyldimethoxysilane, 3-glycidoxypropylmethyldimethoxysilane and 3-aminopropylmethyldiethoxysilane. Of these, alkyltrialkoxysilanes are preferred, and methyltrimethoxysilane and methyltriethoxysilane are particularly preferred. These may be used alone or in combination.

The above hydrolysis condensate of an alkoxysilane can be obtained by hydrolysis condensation of an alkoxysilane of the above formula (I-e) under acidic conditions using water generally in an amount, per equivalent weight of the alkoxy group of the alkoxysilane, of 0.2 to 4 equivalent weights, preferably 0.5 to 2 equivalent weights, more preferably 1 to 1.5 equivalent weight at 20 to 40° C. for 1 hour to several days. The hydrolysis condensation uses an acid, and the acid includes inorganic acids such as hydrochloric acid, sulfuric acid, nitric acid, phosphoric acid, nitrous acid, perchloric acid and sulfamic acid, and organic acids such as formic acid, acetic acid, propionic acid, butyric acid, oxalic acid, succinic acid, maleic acid, lactic acid and p-toluenesulfonic acid. Volatile acids such as acetic acid, hydrochloric acid, etc., are preferred. When an inorganic acid is used, the acid is used generally in a concentration of 0.0001 to 2N, preferably 0.001 to 0.1 N, and when an organic acid is used, the acid is used in an amount in the range, per 100 parts by weight of the alkoxysilane, of from 0.1 to 50 parts by weight, preferably from 1 to 30 parts by weight.

When the above alkoxysilane hydrolysis condensate is incorporated, preferably, a catalyst is added for promoting the condensation of the alkoxysilane hydrolysis condensate. The catalyst includes alkali metal salts, such as lithium salts, sodium salts and potassium salts, of aliphatic carboxylic acids such as formic acid, propionic acid, butyric acid, lactic acid, tartaric acid and succinic acid, and quaternary ammonium salts such as benzyltrimethylammonium salt, tetramethylammonium salt and tetraethylammonium salt. Sodium acetate, potassium acetate and benzyltrimethylammonium acetate are preferred. The amount of the above catalyst per 100 parts by weight of the alkoxysilane hydrolysis condensate is preferably in the range of from 0.5 to 10 parts by weight, more preferably from 1 to 5 parts by weight.

When the hydrolysis condensate of the above formula (I-e) is incorporated, a melamine resin may be further incorporated into the acrylic resin in the coating layer (I) in the present invention. When incorporated, the melamine resin can improve physical properties such as adhesion between the transparent plastic substrate and the cured coating layer (II). Examples of the melamine resin to be incorporated include a complete alkyl type methylated melamine typified by hexamethoxymethylmelamine, hexamethoxymethylmelamine of which the methoxymethyl group is partially converted to a methylol group, an imino group or a butoxymethyl group, and a complete alkyl type butylated melamine typified by hexabutoxymethylmelamine. Specifically, the above melamine resin includes Cymel 300, Cymel 301, Cymel 303, Cymel 350, Cymel 370, Cymel 771, Cymel 325, Cymel 712, Cymel 202, Cymel 207 and Cymel 212 supplied by Mitsui Cytec K. K. Of these resins, a complete alkyl type methylated melamine typified by hexamethoxymethylated melamine is preferably used. Such a resin specifically includes Cymel 300 (average polymerization degree: 1.35, ratio of methoxymethyl group: 95% or more), Cymel 301 (average polymerization degree: 1.5, ratio of methoxymethyl group: 90% or more), Cymel 303 (average polymerization degree: 1.7, ratio of methoxymethyl group: 90% or more) and Cymel 350 (average polymerization degree: 1.6, ratio of methoxymethyl group: 85% or more). These melamine resins are used alone or in combination. When the melamine resin is used, preferably, an acid catalyst is further used for promoting the curing of the above melamine resin. The acid catalyst includes inorganic acids such as hydrochloric acid, sulfuric acid, nitric acid, phosphoric acid, nitrous acid, perchloric acid and sulfamic acid, and organic acids such as maleic acid, formic acid, acetic acid, propionic acid, butyric acid, oxalic acid, succinic acid, lactic acid, benzenesulfonic acid and p-toluenesulfonic acid. Preferably, a volatile acid having a sufficient acidity such as maleic acid, benzenesulfonic acid or p-toluenesulfonic acid is used. The amount of the above acid catalyst per 100 parts by weight of the melamine resin is preferably in the range of from 0.5 to 10 parts by weight, preferably from 1 to 5 parts by weight.

The amount of the melamine resin per 100 parts by weight of the total of the acrylic resin and the hydrolysis condensate of the compound of the above formula (I-e) is preferably 1 to 20 parts by weight, more preferably 3 to 15 parts by weight. When they are mixed in the above amount range, the coating layer (I) can maintain excellent adhesion to the transparent plastic substrate and the cured coating layer (II).

The acrylic resin in the coating layer (I) in the present invention may contain a light stabilizer and an ultraviolet absorbent for weatherability, particularly, photostability, of the transparent plastic substrate. These can be selected from those that are generally used as a light stabilizer and an ultraviolet absorbent for plastics, and above all, desirable are those that do not impair the transparency of the transparent plastic substrate.

Examples of the above light stabilizer include hindered amines such as bis(2,2,6,6-tetramethyl-4-piperidyl) carbonate, bis(2,2,6,6-tetramethyl-4-piperidyl)succinate, bis (2,2,6,6-tetramethyl-4-piperidyl)sebacate, 4-benzoyloxy-2, 2,6,6-tetramethylpiperidine, 4-octanoyloxy-2,2,6,6-tetramethylpiperidine, bis(2,2,6,6-tetramethyl-4-piperidyl) diphenylmethane-p,p'-dicarbamate, bis(2,2,6,6-tetramethyl-4-piperidyl)benzene-1,3-disulfonate and bis(2,2,6,6-tetramethyl-4-piperidyl)phenyl phosphate, and nickel complexes such as nickel bis(octylphenyl)sulfide, nickel complex-3,5-di-t-butyl-4-hydroxybenzyl phosphoric acid monoethylate and nickel dibutyl dithiocarbamate. These light stabilizers may be used alone or in combination, and the amount thereof per 100 parts by weight of the acrylic resin in the coating layer (I) is preferably 0.1 to 50 parts by weight, more preferably 0.5 to 10 parts by weight.

Examples of the ultraviolet absorbent include benzophenones such as 2,4-dihyroxybenzophenone, 2-hydroxy-4-methoxybenzophenone, 2-hydroxy-4-octoxybenzophenone, 4-benzyloxy-2-hydroxybenzophenone, 4-dodecyloxy-2-hydroxybenzophenone, 2,2'-dihydroxy-4,4'-dimethoxybenzophenone and bis(5-benzoyl-4-hydroxy-2-methoxyphenl)methane, benzotriazoles such as 2-(2'-hydroxy-5'-methylphenyl)benzotriazole, 2-(2'-hydroxy-5'-t-octylphenyl)benzotriazole, 2-(3'-t-butyl-5'-methyl-2'-hydroxyphenyl)benzotriazole, 2-(3',5'-di-t-butyl-2'-hydroxyphenyl)benzotriazole, 2-(3',5'-di-t-pentyl-2'-hydroxyphenyl)benzotriazole, 2-(3'-t-butyl-5'-methyl-2'-hydroxyphenyl)-5-chlorobenzotriazole, 2-(3',5'-di-t-butyl-2'-hydroxyphenyl)-5-chlorobenzotriazole, 2-(2H- benzotriazol-2-yl)-4-methyl-6-3,4,5,6,-tetrahydrophthalimidyl)phenol and bis(3-2H-benzotriazol-2-yl-2-hydroxy-5-t-octylphenyl)methane, cyanoacrylates such as ethyl-2-cyano-3,3-diphenyl acrylate and 2-ethylhexyl-2-cyano-3,3-diphenyl acrylate, salicylates such as phenyl salicylate and p-octylphenyl salicylate, benzylidene malonates such as diethyl-p-methoxybenzylidene malonate and bis(2-ethylhexyl)benzylidene malonate, and triazines such as 2-(4,6-diphenyl-1,3,5-triazin-2-yl)-5-hexyloxyphenol. These absorbents may be used alone or in combination.

The ultraviolet absorbent is preferably an ultraviolet absorbent that is soluble in a solvent mixture having a specific composition only up to a specific limit of its amount ratio. When an ultraviolet absorbent having such a feature is used, it is not eluted in a coating solution for the cured coating layer (II) during the application of the coating solution for the cured coating layer (II), so that the abrasion resistance of the cured coating layer (II) is not impaired, and there can be obtained a transparent plastic composite material excellent in abrasion resistance and weatherability. That is, the ultraviolet absorbent is preferably selected from ultraviolet absorbents that have a solubility of 1.5 g/L or less when measured in solvent mixture containing 100 parts by weight of isopropanol, 30 parts by weight of methanol and 15 parts by weight of water at 25° C.

Specific examples of the above ultraviolet absorbent include benzophenones such as 4-benzyloxy-2-hydroxybenzophenone and bis(5-benzoyl-4-hydroxy-2-methoxyphenyl)methan, benzotriazoles such as 2-(2'-hydroxy-5'-t-octylphenyl)benzotriazole, 2-(3'-t-butyl-5'-methyl-2'-hydroxyphenyl)benzotriazole, 2-(3',5'-di-t-butyl-2'-hydroxyphenyl)benzotriazole, 2-(3',5'-di-t-pentyl-2'-hydroxyphenyl)benzotriazole, 2-(3'-t-butyl-5'-methyl-2'-hydroxyphenyl)-5-chlorobenzotriazole, 2-(3',5'-di-t-butyl-2'-hydroxyphenyl)-5-chlorobenzotriazole, 2-(2H-benzotriazol-2-yl)-4-methyl-6-3,4,5,6-tetrahydrophthalimidyl)phenol and bis(3-2H-benzotriazol-2-yl-2-hydroxy-5-t-octylphenyl)methane and triazines such as 2-(4,6-diphenyl-1,3,5-triazin-2-yl)-5-hexyloxyphenol.

Further, when the plastic forming the transparent plastic substrate is an aromatic polycarbonate resin, the ultraviolet absorbent is particularly preferably selected from 2-(3'-t-butyl-5'-methyl-2'-hydroxyphenyl)-5-chlorobenzotriazole, 2-(3',5'-di-t-butyl-2'-hydroxyphenyl)-5-chlorobenzotriazole, 2-(2'-hydroxy-5'-t-octylphenyl)benzotriazole or 2-(4,6-diphenyl-1,3,5-triazin-2-yl)-5-hexyloxyphenol.

The amount of the above ultraviolet absorbent per 100 parts by weight of the acrylic resin in the coating layer (I) is 0.7 to 100 parts by weight, preferably 3 to 60 parts by weight, more preferably 5 to 50 parts by weight. Particularly, when the acrylic resin is an acrylic copolymer resin having the ultraviolet absorbent residue shown in the above formula (I-d), the above ultraviolet absorbent is incorporated such that the total sum of the weight of the units of the above formula (I-d) and the ultraviolet absorbent comes into the above range. That is, when the recurring units of the above formula (I-d) are contained as an acrylic copolymer resin in addition to the ultraviolet absorbent incorporated, the amount of the ultraviolet absorbent in the present specification is calculated by including the amount of the ultraviolet absorbent residue of the formula (I-d) (i.e., total amount of W).

In the present invention, generally and preferably, the coating layer (I) as a first layer is formed on the surface of the transparent plastic substrate by a method in which a solution of the above acrylic resin in a proper solvent is coated and the solvent is removed. That is, the above acrylic resin component (including the acryl compolymer resin and other resin component) is dissolved in a volatile solvent that is free from reacting with the transparent plastic as a substrate and dissolving said transparent plastic, together with the light stabilizer and/or the ultraviolet absorbent as required, to prepare a coating composition, the coating composition is applied onto the surface of the transparent plastic substrate, and the solvent is removed by heating or the like. After the removal of the solvent, it is preferred to further heat the coating to 40 to 140° C. as required, to crosslink crosslinking groups.

The above solvent includes ketones such as acetone, methyl ethyl ketone, methyl isobutyl ketone and cyclohexanone, ethers such as tetrahydrofuran, 1,4-dioxane and 1,2-dimethoxyethane, esters such as ethyl acetate and ethoxyethyl acetate, alcohols such as methanol, ethanol, 1-propanol, 2-propanol, 1-butanol, 2-butanol, 2-methyl-1-propanol, 2-ethoxyethanol, 4-methyl-2-pentanol and 2-butoxyethanol, hydrocarbons such as n-hexane, n-heptane, isooctane, benzene, toluene, xylene, gasoline, light oil and kerosene; acetonitrile, nitromethane and water. These may be used alone or in combination. In the above coating composition, the concentration of a solid component formed of the coating resin is preferably 1 to 50% by weight, more preferably 3 to 30% by weight.

The above coating composition is applied to the plastic substrate by a method that can be properly selected from a bar coating method, a dip coating method, a flow coating method, a spray coating method, a spin coating method, a roller coating method, or the like depending upon the size and form of the substrate to be coated therewith. In the substrate coated with the above coating composition, the solvent is dried and removed generally at a temperature between room temperature and the heat distortion temperature of the substrate, and further, if necessary, the substrate is heated to 40 to 140° C. to crosslink crosslinking groups after the removal of the solvent, whereby there is obtained the transparent plastic substrate on which the coating layer (I) as a first layer is stacked.

The thickness of the coating layer (I) as a first layer can be any thickness so long as the coating layer (I) can fully bond the transparent plastic substrate and the second layer and can hold necessary amounts of the above various additives. The thickness above is preferably 0.1 to 10 µm, more preferably 1 to 5 µm.

When the first layer made of the coating layer mainly containing the above acrylic resin is formed, the adhesion between the second layer and the transparent plastic substrate is improved, and there can be obtained a transparent plastic composite material excellent in abrasion resistance and weatherability.

In the transparent plastic composite material of the present invention, the thermally cured coating layer (II) made of an organosiloxane resin having a specific composition as a second layer is further stacked on the surface of the coating layer (I) stacked on the surface of the above transparent plastic substrate.

The above second layer is a thermally cured coating layer (II) made of an organosiloxane resin formed from the following components a, b and c,
(A) colloidal silica (component a)
(B) a hydrolysis condensate of a trialkoxysilane of the following formula (II-1) (component b), $$R^2Si(OR^3)_3 \tag{II-1}$$

wherein $R^2$ is an alkyl group having 1 to 4 carbon atoms, a vinyl group or an alkyl group which is substituted with one or more groups selected from methacryloxy, amino, glycidoxy and 3,4-epoxycyclohexyl and has 1 to 3 carbon atoms, and $R^3$ is an alkyl group having 1 to 4 carbon atoms, and (C) a hydrolysis condensate of a tetraalkoxysilane of the following formula (II-2) (component c),

$$Si(OR^4)_4 \quad (II-2)$$

wherein $R^4$ is an alkyl group having 1 to 4 carbon atoms, the organosiloxane resin being a resin composition containing 5 to 45% by weight of the component a, 50 to 80% by weight, as $R^2SiO_{3/2}$, of the component b and 2 to 30% by weight, as $SiO_2$, of the component c.

The second layer is preferably formed from a coating composition containing an organosiloxane resin solid component formed from the above (A) colloidal silica (component a), (B) hydrolysis condensate of a trialkoxysilane (component b) and (C) hydrolysis condensate of a tetraalkoxysilane (component c), an acid, a curing catalyst and a solvent. Each of the above components a, b and c will be explained below.

The colloidal silica as component a refers to a colloidal dispersion of fine silica particles having a diameter of 5 to 200 nm, preferably 5 to 40 nm, in water or an organic solvent. While the colloidal silica may be any type such as a type of a dispersion in water and a type of dispersion in an organic solvent, it is preferred to use a dispersion in water. The colloidal silica specifically includes Snowtex 0 supplied by Nissan Chemical Industries, Ltd. as a commercial product that is a dispersion in an acidic aqueous solution, Snowtex 30 and Snowtex 40 supplied by Nissan Chemical Industries, Ltd. and Cataloid S30 and Cataloid S40 supplied by Catalysts & Chemicals Ind. Co. Ltd. as commercial products that are dispersions in a basic aqueous solution, and MA-ST, IPA-ST, NBA-ST, IBA-ST, EG-ST, XBA-ST, NPC-ST and DMAC-ST supplied by Nissan Chemical Industries, Ltd. as commercial products that are dispersions in an organic solvent.

The hydrolysis condensate of a trialkoxysilane as component b is a product formed by hydrolysis condensation of a trialkoxysilane of the above formula (II-1).

Examples of the above trialkoxysilane includes methyltrimethoxysilane, methyltriethoxysilane, ethyltrimethoxysilane, isobutyltrimethoxysilane, vinyltrimethoxysilane, vinyltriethoxysilane, γ-methacryloxypropyltrimethoxysilane, β-(3,4-epoxycyclohexyl)ethyltrimethoxysilane, γ-glycidoxypropyltrimethoxysilane, γ-aminopropyltrimethoxysilane, γ-aminopropyltriethoxysilane, N-β(aminoethyl)γ-aminopropyltrimethoxysilane and N-β(aminoethyl)γ-aminopropyltriethoxysilane. These may be used alone or in combination.

For obtaining a coating composition to form a coating layer having excellent abrasion resistance in particular, preferably, methyltrialkoxysilane constitutes at least 70% by weight of the entire trialkoxysilanes, and more preferably, methyltrialkoxysilane constitutes substantially the entire trialkoxysilanes. For the purpose of improving adhesion and exhibiting functions such as hydrophilicity and water repellency, a small amount of trialkoxysilanes other than the methyltrialkoxysilane may be added.

The hydrolysis condensate of a tetraalkoxysilane as component (c) is a product formed by hydrolysis condensation of a tetralakoxysilane of the above formula (II-2). Examples of the above tetraalkoxysilane include tetramethoxysilane, tetraethoxysilane, tetra-n-propoxysilane, tetraisopropoxysilane, tetra-n-butoxysilane and tetraisobutoxysilane. Tetramethoxysilane and tetraethoxysilane are preferred. These tetraalkoxysilanes may be used alone or in combination.

The components b and c is a mixture of hydrolysis products of part or the whole of the above alkoxysilanes and a condensation product of part or the whole of the above hydrolysis products, and these can be obtained by a sol-gel reaction.

For preparing the organosiloxane solid component formed of the components a to c, it is preferred to prepare the organosiloxane solid component through the following processes (1) and (2), since no precipitate is formed and since the cured layer (II) having superior abrasion resistance can be obtained.

Process (1): The trialkoxysilane of the above formula (II-1) is allowed to undergo a hydrolysis condensation in a colloidal silica dispersion under an acidic condition.

When a dispersion of the colloidal silica in water is used, the dispersion supplies water required for the hydrolysis of the trialkoxysilane. Additional water may be added as required. In this case, the water is used generally in an amount of 1 to 10 equivalent weights, preferably 1.5 to 7 equivalent weights, more preferably 3 to 5 equivalent weight, per equivalent weight of the trialkoxysilane.

It is required to carry out the hydrolysis condensation of the trialkoxysilane under an acidic condition as described above, and an acid is generally used as a hydrolyzer for carrying out the hydrolysis under the above condition. Such an acid may be added to the trialkoxysilane or the colloidal silica beforehand, or may be added to a mixture thereof. Further, the acid may be added once or may be added twice or more times. The acid includes inorganic acids such as hydrochloric acid, sulfuric acid, nitric acid, phosphoric acid, nitrous acid, perchloric acid and sulfamic acid and organic acids such as formic acid, acetic acid, propionic acid, butyric acid, oxalic acid, succinic acid, maleic acid, lactic acid and p-toluenesulfonic acid. Organic carboxylic acids such as formic acid, acetic acid, propionic acid, lactic acid, oxalic acid, succinic acid and maleic acid are preferred since a pH can be easily controlled, and acetic acid is particularly preferred.

When the above acid is selected from the inorganic acids, an inorganic acid is generally used in a concentration of 0.0001 to 2 N, preferably 0.001 to 0.1 N. When it is selected from the organic acids, the amount of an organic acid per 100 parts by weight of the trialkoxysilane is in the range of from 0.1 to 50 parts by weight, preferably from 1 to 30 parts by weight.

Conditions under which the hydrolysis and condensation of the trialkoxysilane are carried out cannot be uniformly determined since they differ depending upon the kind of the trialkoxysilane and the kind and amount of the colloidal silica co-present in a reaction system. Generally, the temperature of the reaction system is 20 to 40° C., and the reaction time period is 1 hour to several days.

Process (2): (i) The tetraalkoxysilane of the above formula (II-2) is added to the reaction solution obtained by the reaction in the process (1), or (ii) the reaction solution obtained by the reaction in the process (1) and a reaction solution prepared in advance by hydrolysis condensation of the tetraalkoxysilane of the above formula (II-2) are mixed.

(i) When the tetralakoxysilane is added to the reaction solution obtained by the reaction in the process (1) to carry out hydrolysis condensation, the hydrolysis condensation is carried out under an acidic condition. The reaction solution obtained by the reaction in the process (1) is generally acidic and contains water, so that the tetraalkoxysilane can be added as it is. Further, water and an acid may be added as required. The acid can be selected from the above-described acids, and a volatile acid such as acetic acid or hydrochloric acid is preferred. When the acid is selected from the inorganic acids, an inorganic acid is generally used in a concentration of 0.0001 to 2 N, preferably 0.001 to 0.1 N. When it is selected from the organic acids, the amount of an organic acid per 100 parts by weight of the tetraalkoxysilane is in the range of from 0.1 to 50 parts by weight, preferably from 1 to 30 parts by weight.

Water for the hydrolysis is used generally in an amount of 1 to 100 equivalent weights, preferably 2 to 50 equivalent weights, more preferably 4 to 30 equivalent weight, per equivalent weight of the tetraalkoxysilane.

Conditions under which the hydrolysis and condensation of the tetraalkoxysilane are carried out cannot be uniformly determined since they differ depending upon the kind of the tetraalkoxysilane and the kind and amount of the colloidal silica co-present in a reaction system. Generally, the temperature of the reaction system is 20 to 40° C., and the reaction time period is 10 minutes to several days.

(ii) The reaction solution obtained by the reaction in the process (1) and a reaction solution prepared in advance by hydrolysis condensation of the tetraalkoxysilane of the above formula (II-2) may be mixed. In this case, it is required to allow the tetraalkoxysilane to undergo hydrolysis and condensation beforehand. The above hydrolysis condensation is carried out by a reaction under an acidic condition with water generally in an amount, per equivalent weight of the tetraalkoxysilane, of 1 to 100 equivalent weights, preferably 2 to 50 equivalent weights, more preferably 4 to 20 equivalent weights at 20 to 40° C. for 1 hour to several days. The above hydrolysis condensation uses an acid, and the acid is selected from the above acids. A volatile acid such as acetic acid or hydrochloric acid is preferred. When the acid is selected from the inorganic acids, an inorganic acid is generally used in a concentration of 0.0001 to 2 N, preferably 0.001 to 0.1 N. When it is selected from the organic acids, the amount of an organic acid per 100 parts by weight of the tetraalkoxysilane is in the range of from 0.1 to 50 parts by weight, preferably from 1 to 30 parts by weight.

The mixing ratio of the components a to c that are the above organosiloxane resin solid component is determined in view of stability of an obtained coating composition solution and transparency, abrasion resistance, anti-scratch resistance, adhesion and cracking-occurrence of an obtained cured layer. Preferably, the component a is used in an amount of 15 to 35% by weight, the component b is used in an amount of 55 to 75% by weight as $R^2SiO_{3/2}$, and the component c is used in an amount of 3 to 20% by weight as $SiO_2$.

The amount ratio of the components a to c that constitute the organosiloxane resin solid component in the cured coating layer (II) is particularly preferably as follows: The amount of the component b as $R^2SiO_{3/2}$ is in the range of 60 to 75% by weight, and (i) when the amount of the component b is at least 60% by weight but less than 65% by weight, the amount of the component a is 25 to 35% by weight and the amount of the component c as $SiO_2$ is 3 to 10% by weight. Alternatively, (ii) when the amount of the component b is at least 65% by weight but not more than 75% by weight, the amount of the component a is 15 to 30% by weight and the amount of the component c as $SiO_2$ is 5 to 20% by weight.

Generally, the above coating composition for the second layer preferably further contains a curing catalyst. The catalyst includes alkali metal salts such as lithium salts, sodium salts and potassium salts and quaternary ammonium salts such as benzyltrimethylammonium salt, tetramethylammonium salt and tetraethylammonium salt of aliphatic carboxylic acids such as formic acid, propionic acid, butyric acid, lactic acid, tartaric acid or succinic acid. Above all, sodium acetate, potassium acetate or benzyltrimethylammonium acetate is preferred. When a dispersion of the colloidal silica in basic water is used as a colloidal silica and when an aliphatic carboxylic acid is used as an acid in the hydrolysis of the alkoxysilane, it means that a curing catalyst is already contained in the coating composition. Although differing depending upon curing conditions, the content of the curing catalyst per 100 parts by weight of the organosiloxane resin solid component formed of the components a to c is preferably 0.01 to 10 parts by weight, more preferably 0.1 to 5 parts by weight.

The solvent for the above coating solution for the second layer is required to stably dissolve the above organosiloxane resin solid component, and for this purpose, desirably, the solvent contains at least 20% by weight, preferably at least 50% by weight, of an alcohol. Examples of the alcohol include methanol, ethanol, 1-propanol, 2-propanol, 1-butanol, 2-butanol, 2-methyl-1-propanol, 2-ethoxyethanol, 4-methyl-2-pentanol and 2-butoxyethanol. A low-boiling-point alcohol having 1 to 4 carbon atoms is preferred, and 2-propanol is particularly preferred in view of solubility, stability and coating properties. The above solvent includes water which comes from the dispersion of the colloidal silica in water and does not contribute to the hydrolysis, a lower alcohol formed together with the hydrolysis of the alkoxysilane, an organic solvent that comes from a dispersion of the colloidal silica in an organic solvent and an acid added for adjusting the pH of the coating composition. The acid used for the pH adjustment includes inorganic acids such as hydrochloric acid, sulfuric acid, nitric acid, phosphoric acid, nitrous acid, perchloric acid and sulfamic acid and organic acids such as formic acid, acetic acid, propionic acid, butyric acid, oxalic acid, succinic acid, maleic acid, lactic acid and p-toluenesulfonic acid. Of these, an organic acid such as formic acid, acetic acid, propionic acid, butyric acid, oxalic acid, succinic acid or maleic acid is preferred in view of an easiness in pH control. Other solvent is required to be miscible with water/alcohol, and examples of the "other solvent" include ketones such as acetone, methyl ethyl ketone and methyl isobutyl ketone; ethers such as tetrahydrofuran, 1,4-dioxane and 1,2-dimethoxyethane; and esters such as ethyl acetate and ethoxyethyl acetate. The amount of the solvent per 100 parts by weight of the organosiloxane resin solid component formed of the components a to c is preferably 50 to 900 parts by weight, more preferably 150 to 700 parts by weight.

Desirably, the pH of the coating composition for the second layer is adjusted to 3.0 to 6.0, preferably 4.0 to 5.5 by adjusting the contents of the acid and the curing catalyst, whereby the gelation of the coating composition at room temperature can be prevented, so that the shelf life thereof can be increased. The coating composition can come to be a stabler composition when aged generally for several hours to several days.

The coating composition for the second layer is coated on the first coating layer formed on the transparent plastic substrate and cured under heat to form the second layer. The coating method can be selected from a bar coating method, a dip coating method, a flow coating method, a spray coating method, a spin coating method or a roller coating method as required depending upon the size and form of the substrate to be coated. In the substrate coated with the above composition, the solvent is dried and removed at a temperature between room temperature and the heat distortion temperature of the substrate, and then, the composition is cured under heat. The thermal curing is preferably carried out at a high temperature in a range in which no problem is caused on the heat resistance of the substrate, since the curing can be completed sooner. At room temperature, the thermal curing does not proceed, and no cured coating layer can be obtained. This means that the organosiloxane resin solid component in the coating composition is a partial condensate. In the thermal curing process, residual Si—OH undergoes condensation to form Si—O—Si bonds, and a coating layer having excellent abrasion resistance is formed. The thermal curing is preferably carried out in a range of from 50° C. to 200° C. for 10 minutes to 4 hours, more preferably in the range of from 80 to 160° C. for 20 minutes to. 3 hours. When the plastic forming the transparent plastic substrate is an aromatic polycarbonate resin, the thermal curing is carried out preferably in the range of from 100° C. to 140° C. for 30 minutes to 2 hours.

The thickness of the second layer is generally 2 to 10 μm, preferably 3 to 8 μm. When the thickness of the cured coating layer (II) is in the above range, there is no case where the cured coating layer (II) undergoes cracking due to a stress caused during its thermal curing or where the adhesion between the cured coating layer (II) and the substrate decreases. The cured coating layer (II) having sufficient abrasion resistance, which is an object of the present invention, can be obtained.

Further, The above coating compositions for the first layer and the second layer may contain a known leveling agent for improving coating properties and smoothness of the coating layers to be obtained. The amount thereof per 100 parts by weight of the coating composition is preferably in the range of from 0.01 to 2 parts by weight. The above coating compositions may contain a dye, a pigment and a filler so long as the object of the present invention is not impaired.

Particularly preferred embodiments of the transparent plastic composite material of the present invention will be explained below. That is, the transparent plastic composite material of the present invention having the transparent plastic substrate made of an aromatic polycarbonate resin and any one of the following combinations (A) to (D) of the coating layer (I) and the cured coating layer (II) stacked on the surface thereof is the most preferred since they have excellent properties.

(A) A transparent plastic composite material wherein:
(1) the coating layer (I) is formed of a resin composition containing an acrylic copolymer resin which is formed of recurring units of the following formulae (I-a) and (I-b),

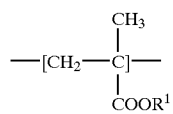
(I-a)

wherein $R^1$ is as defined in the above formula (I-a),

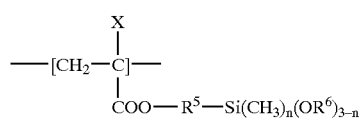
(I-b)

wherein X, $R^5$, $R^6$ and n are as defined in the above formula (I-b),
and which has a (I-a):(I-b) unit ratio in the range of from 97:3 to 70:30 and 3 to 60 parts by weight, per 100 parts by weight of the acrylic copolymer resin, of an ultraviolet absorbent, the ultraviolet absorbent having a solubility of 1.5 g/L or less in a solvent mixture containing 100 parts by weight of isopropanol, 30 parts by weight of methanol and 15 parts by weight of water when measured at 25° C., and
(2) the coating layer (II) is a thermally cured layer of a resin composition containing 15 to 35% by weight of the component a, 55 to 75% by weight, as $R^2SiO_{3/2}$, of the component b and 3 to 20% by weight, as $SiO_2$, of the component c.

(B) A transparent plastic composite material wherein:
(1) the coating layer (I) is formed of a resin composition containing an acrylic copolymer resin which is formed of recurring units of the following formulae (I-a), (I-b) and (I-d),

(I-a)

wherein $R^1$ is as defined in the above formula (I-a),

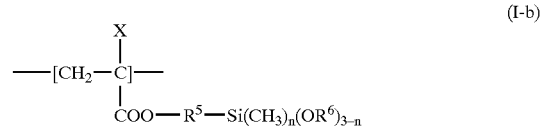
(I-b)

wherein X, $R^5$, $R^6$ and n are as defined in the above formula (I-b),

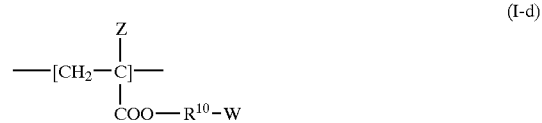
(I-d)

wherein Z, $R^{10}$ and W are as defined in the above formula (I-d),
and which has a (I-a):(I-b):(I-d) unit ratio in the range of from 96.7–60:3–30:0.3–15 and 3 to 60 parts by weight, per 100 parts by weight of the acrylic copolymer resin, of an ultraviolet absorbent, the ultraviolet absorbent having a solubility of 1.5 g/L or less in a solvent mixture containing 100 parts by weight of isopropanol, 30 parts by weight of methanol and 15 parts by weight of water when measured at 25° C., and
(2) the coating layer (II) is a thermally cured layer of a resin composition containing 15 to 35% by weight of the component a, 55 to 75% by weight, as $R^2SiO_{3/2}$, of the component b and 3 to 20% by weight, as $SiO_2$, of the component c.

(C) A transparent plastic composite material wherein:
(1) the coating layer (I) is formed of a resin composition containing 100 parts by weight of an acrylic copolymer resin which is formed of recurring units of the following formulae (I-a) and (I-c),

(I-a)

wherein $R^1$ is as defined in the above formula (I-a),

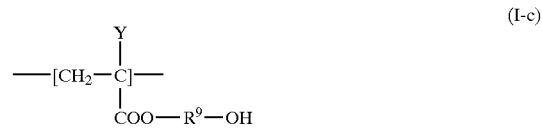
(I-c)

wherein Y and $R^9$ are as defined in the above formula (i-c) and which has a (I-a):(I-c) unit ratio in the range of from 95:5 to 60:40, a mixture (as $R^7_rSiO_{4-r/2}$) of hydrolysis condensates of a compound of the formula (I-e), $$R^7_r\text{—}Si(OR^8)_{4-r} \quad \text{(I-e)}$$

wherein $R^7$, $R^8$ and r are as defined in the above formula (I-e), the mixture having such an amount that the ratio of the acrylic copolymer resin: the hydrolysis condensates comes to be 99:1 to 60:40 by weight, a melamine resin in such an amount that the amount thereof per 100 parts by weight of the total of the acrylic copolymer resin and the hydrolysis condensates comes to be 3 to 15 parts by weight, and 3 to 60 parts by weight, per 100 parts by weight of the acrylic copolymer resin, of an ultraviolet absorbent, the ultraviolet absorbent having a solubility of 1.5 g/L or less in a solvent mixture containing 100 parts by weight of isopropanol, 30 parts by weight of methanol and 15 parts by weight of water when measured at 25° C., and (2) the coating layer (II) is a thermally cured layer of a resin composition containing 15 to 35% by weight of the component a, 55 to 75% by weight, as $R^2SiO_{3/2}$, of the component b and 3 to 20% by weight, as $SiO_2$, of the component c.

(D) A transparent plastic composite material wherein:

(1) the coating layer (I) is formed of a resin composition containing 100 parts by weight of an acrylic copolymer resin which is formed of recurring units of the following formulae (I-a), (I-c) and (I-d),

wherein $R^1$ is as defined in the above formula (I-a),

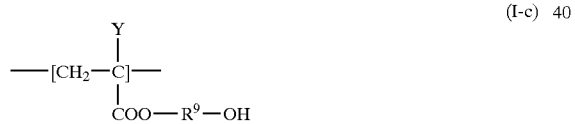

wherein Y and $R^9$ are as defined in the above formula (I-c),

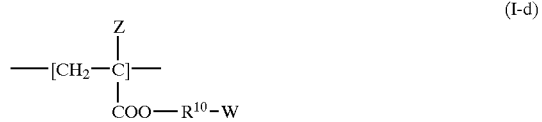

wherein Z, $R^{10}$ and W are as defined in the above formula (I-d), and which has a (I-a):(I-c):(I-d) unit ratio in the range of from 94.7–50:5–40:0.3–15, a mixture (as $R^7_r SiO_{4-r/2}$) of hydrolysis condensates of a compound of the formula (I-e), $$R^7_r\text{—}Si(OR^8)_{4-r} \quad \text{(I-e)}$$

wherein $R^7$, $R^8$ and r are as defined in the above formula (I-e), the mixture having such an amount that the ratio of the acrylic copolymer resin: the hydrolysis condensates comes to be 99:1 to 60:40 by weight, a melamine resin in such an amount that the amount thereof per 100 parts by weight of the total of the acrylic copolymer resin and the hydrolysis condensates comes to be 3 to 15 parts by weight, and 3 to 60 parts by weight, per 100 parts by weight of the acrylic copolymer resin, of an ultraviolet absorbent, the ultraviolet absorbent having a solubility of 1.5 g/L or less in a solvent mixture containing 100 parts by weight of isopropanol, 30 parts by weight of methanol and 15 parts by weight of water when measured at 25° C., and (2) the coating layer (II) is a thermally cured layer of a resin composition containing 15 to 35% by weight of the component a, 55 to 75% by weight, as $R^2SiO_3/2$, of the component b and 3 to 20% by weight, as $SiO_2$, of the component c.

The thus-obtained surface-protected transparent plastic composite material of the present invention has a first layer formed mainly of the acrylic resin and a second layer formed by thermally curing the organosiloxane resin made from colloidal silica, the trialkoxysilane hydrolysis condensate and the tetraalkyoxysilane hydrolysis condensate, so that it constitutes a composite material having unconventionally high-level abrasion resistance.

The transparent plastic composite material of the present invention has a thickness in the range of from 0.001 to 10 mm, preferably 0.02 to 8 mm. When the plastic constituting the transparent plastic substrate is an aromatic polycarbonate resin in particular, practically, the above thickness is preferably in the range of from 0.1 to 8 mm. Further, the transparent plastic composite material of the present invention undergoes no cracking under high-temperature and high-humidity conditions, and after it is maintained in boiling water for 3 hours, the occurrence of cracking is substantially not observed on the surface thereof.

The above transparent plastic composite material can be suitably used in windows of an aircraft, a car and an automobile, windows of a building, a house, a garage, a green room and an arcade, a headlight lens, an optical lens, a mirror, eyeglasses, goggles, an insulating wall, a lens of a traffic light lamp, a curved mirror, a windshield, a windscreen, a name plate, other various sheets, films, and the like.

When subjected to a 1,000-rotation Taber abrasion test (ASTM D1044) using a CS-10F abrasion wheal supplied by Calibrase under a load of 500 g, the transparent plastic composite material obtained in the present invention shows a change of 2% or less between its haze values before and after the test. That is, the transparent plastic composite material obtained in the present invention satisfies the JIS standard requiring that the outer side of windshield of an automobile should satisfy a change of 2% or less between its haze values before and after the test with a Taber abrasion tester under conditions similar to the above, and such a composite material can be suitably used as a window glass of an automobile and an aircraft.

EXAMPLES

The present invention will be explained more in detail with reference to Examples hereinafter, while the present invention shall not be limited by Examples. Polycarbonate resin composite materials obtained were evaluated by the following methods. In Examples, "part" and "%" stand for "part by weight" and "% by weight".

(1) Evaluation of appearance: The appearance of a coating layer of a test piece was visually observed (for a foreign matter) and for a cracking.

(2) Adhesion: A coating layer was cut at intervals of 1 mm with a cutter to make 100 sections, an adhesive tape (trade name "Cellotape"®) supplied by Nichiban was attached under pressure and intensely peeled off in the perpendicular direction, and the adhesion was evaluated on the basis of the number of sections remaining on a substrate (according to JIS K5400).

Further, the procedure of attaching and peeling a tape to/from the sections was further repeated twice, and the adhesion was evaluated on the basis of sections remaining on the substrate.

(3) Abrasion resistance: A 1,000-rotation Taber abrasion test (ASTM D1044) was carried out using a CS-10F abrasion wheal supplied by Calibrase under a load of 500 g, and a difference $\Delta H$ (%) between a haze (%) before the Taber abrasion test and a haze (%) after the Taber abrasion test was determined for evaluation (according to ASTM D1044).

(Haze=Td/Tt×100, Td: transmissivity of scattered light, Tt: transmissivity of total light)

(Haze measurement was conducted with a haze meter 1001DP supplied by Nippon Denshoku K. K.)

(4) Durability against boiling water: A test piece was immersed in boiling water for 3 hours, and then it was evaluated for an appearance and adhesion.

(5) Weatherability: A test piece was subjected to an exposure test with a sunshine weatherometer WEL-SUN-HCH-B (black panel temperature: 63° C., under a condition of 18 minutes' rainfall of 120 minutes) for 1,000 hours, and the test piece was taken out and evaluated for an appearance, adhesion and a change ($\Delta YI$) between yellowing indexes before and after the test. (Yellowing index (YI) was measured with a spectral color tester SE-2000 supplied by Nippon Denshoku K. K.)

(6) Measurement of molecular weight: GPC measurement was carried out using Shodex GPCA-804 as a column and tetrahydrofuran as an eluant, to determine a weight average molecular weight as a polystyrene.

(Synthesis of Acrylic Resins (AC-1)–(AC-16)

Referential Example 1

A flask having a reflux condenser and a stirrer and having nitrogen substituted for air inside was charged with 65 parts of methyl methacrylate (to be abbreviated as "MMA" hereinafter), 25 parts of 2-(2'-hydroxy-5'-methacryloxyethylphenyl)benzotriazole (to be abbreviated as "MEBT" hereinafter), 10 parts of 3-methacryloxypropyl-trimethoxysilane (to be abbreviated as "MPTMS" hereinafter), 0.16 part of azobisisobutyronitrile and 200 parts of 1,2-dimethoxyethane, and these contents were mixed and dissolved. Then, the mixture was allowed to react under nitrogen current at 70° C. for 6 hours. The resultant reaction mixture was added to n-hexane for re-precipitation and purification, to give 86 parts of an acrylic copolymer resin (to be abbreviated as "AC-1" hereinafter) having an MMA/MEBT/MPTMS composition ratio of 65/25/10 by weight ratio (85/10/5 by molar ratio). The above copolymer had a weight average molecular weight of 90,000.

Referential Examples 2–16

Synthesis was carried out in the same manner as in Referential Example 1 except that the monomer composition was changed as shown in Table 1, to give acrylic resins (AC-2 to AC-16). Table 1 shows compositions and molecular weights of the acrylic resins.

TABLE 1

| Acrylic resin | Monomer composition | | | | | | Molecular weight |
|---|---|---|---|---|---|---|---|
| | MMA | EMA | MEBT | MEBP | HEMA | MPTMS | |
| (AC-1) | 65 | | 25 | | | 10 | 90,000 |
| (AC-2) | 72 | | 13 | | | 15 | 140,000 |
| (AC-3) | 60 | | 13 | | 27 | | 70,000 |
| (AC-4) | 74 | | 15 | | 11 | | 80,000 |
| (AC-5) | 64 | | 25 | | 11 | | 60,000 |
| (AC-6) | 77 | | 13 | | | 10 | 90,000 |
| (AC-7) | 60 | 15 | | 14 | 11 | | 80,000 |
| (AC-8) | 60 | 15 | 14 | | 11 | | 100,000 |
| (AC-9) | 70 | | | | 39 | | 80,000 |
| (AC-10) | 90.1 | | | | 13 | | 180,000 |
| (AC-11) | 95.1 | | | | | 12.4 | 120,000 |
| (AC-12) | | 80 | | | 10 | 10 | 140,000 |
| (AC-13) | 90.1 | | | | | 24.8 | 150,000 |
| (AC-14) | 70 | 15 | 10 | | 5 | | 100,000 |
| (AC-15) | 36 | | | | | 64 | 80,000 |
| (AC-16) | 30 | | 30 | | 30 | 10 | 60,000 |

(Preparation of Organosiloxane Resin Solution)

Referential Example 17

142 Parts of methyltrimethoxysilane, 72 parts of >distilled water and 20 parts of acetic acid were mixed with cooling with ice water. The mixture was stirred at 25° C. for 1 hour and diluted with 116 parts of isopropanol, to give 350 parts of a methyltrimethoxysilane hydrolysis condensate solution (to be abbreviated as "X" hereinafter).

Referential Example 18

208 Parts of tetraethoxysilane and 81 parts of 0.01 N hydrochloric acid were mixed with cooling with ice water. The mixture was stirred at 25° C. for 3 hours and diluted with 11 parts of isopropanol, to give 300 parts of a tetraethoxysilane hydrolysis condensate solution (to be abbreviated as "Y" hereinafter).

(Preparation of Acrylic Resin Solutions (h-1)–(h-21))

Referential Example 19

9 Parts of the above acrylic copolymer resin (AC-1) was dissolved in 60 parts of 4-methyl-2-pentanone and 30 parts of 2-butanol, to obtain 99 parts of an acrylic resin solution (h-1).

Referential Examples 20–39

Acrylic resin solutions (h-2) to (h-21) were prepared from various acrylic copolymer resins in the same manner as in Referential Example 19. Table 2 shows compositions thereof.

TABLE 2

| Acrylic resin solution | Acrylic resin Type No. | Amount | MEK | MIBK | 2-BuOH | IPA | EtOH | EGE | PMA |
|---|---|---|---|---|---|---|---|---|---|
| (h-1) | (AC-1) | 9 | | 60 | 30 | | | | |
| (h-2) | (AC-2) | 18 | | 60 | 20 | | | | |
| (h-3) | (AC-3) | 14 | 15.7 | 31.2 | 10 | | | | 13.4 |
| (h-4) | (AC-4) | 13 | 16.3 | 27 | 11 | | | 9.6 | |
| (h-5) | (AC-5) | 15 | | 36 | | 10 | | | 18 |
| (h-6) | (AC-5) | 10.5 | 15 | 30 | 11.5 | | | 20 | |
| (h-7) | (AC-6) | 16 | 16 | 40 | 28 | | | | |
| (h-8) | (AC-7) | 15 | 5 | 30 | 18 | | | | 11 |
| (h-9) | (AC-8) | 10.5 | 10 | 40 | 10 | | | 12.9 | |
| (h-10) | (AC-9) | 6 | 18 | 36 | 25 | 5 | | | |
| (h-11) | (AC-10) | 6.7 | 18 | 36 | 25 | 4.9 | | | |
| (h-12) | (AC-11) | 18 | | 54 | 26 | | | | |
| (h-13) | (AC-5) | 15 | 4.9 | 28 | 21 | | | | 10 |
| (h-14) | (AC-12) | 9 | | 60 | 30 | | | | |
| (h-15) | (AC-11) | 20 | | 60 | 20 | | | | |
| (h-16) | (AC-13) | 10 | | 60 | 20 | | | 10 | |
| (h-17) | (AC-9) | 7.4 | 37 | 18.5 | | 12.9 | 4.9 | 9.2 | |
| (h-18) | (AC-9) | 11.5 | 43.2 | | 9.3 | | | 21.6 | |
| (h-19) | (AC-14) | 15 | 20 | 20 | 14 | | | | 14 |
| (h-20) | (AC-15) | 9 | | 60 | 30 | | | | |
| (h-21) | (AC-16) | 10 | | 45 | 20 | | | | 25 |

(Preparation of Organosiloxane Resin Solutions (i-1)–(i-5)

Referential Example 40

80 Parts of the methyltrimethoxysilane hydrolysis condensate solution (X), 20 parts of the tetraethoxysilane hydrolysis condensate solution (Y) and 1 part of tetrabutylammonium hydroxide as a curing catalyst were mixed to give an organosiloxane resin solution (i-1).

Referential Examples 41–44

Organosiloxane resin solutions (i-2) to (i-5) having respective compositions were prepared in the same manner as in Referential Example 40. Table 3 shows the respective compositions.

TABLE 3

| Organosiloxane resin solution | x | y | AcONa | Nbu₄OH |
|---|---|---|---|---|
| i-1 | 80 | 20 | | 1 |
| i-2 | 100 | | 0.5 | |
| i-3 | 100 | | | 1 |
| i-4 | 100 | | | |
| i-5 | 70 | 30 | | 0.8 |

(Preparation of Melamine Resin Formulations (j-1)–(j-4)

Referential Example 45

100 Parts of Cymel 303 (hexamethoxymethylated melamine resin supplied by Mitsui-Cytec) and 3 parts of p-toluenesulfonic acid as a curing catalyst were mixed to give a melamine resin formulation (j-1).

Referential Examples 46–48

Melamine resin formulations (j-2) to (j-4) having respective compositions were prepared in the same manner as in Referential Example 45. Table 4 shows the respective compositions.

TABLE 4

| Melamine resin formulations | Cymel 303 | Cymel 300 | Cymel 350 | p-TSA | Maleic acid |
|---|---|---|---|---|---|
| j-1 | 100 | | | 3 | |
| j-2 | 100 | | | | |
| j-3 | | 100 | | 3 | |
| j-4 | | | 100 | | 5 |

(Preparation of First Layer Coating Solutions (I-1)–(I-23))

Referential Example 49

99 Parts of the acrylic resin solution (h-1) and 1 part of 2-(2'-hydroxy-5'-t-octylphenyl)benzotriazole (to be referred to as "UV-1" hereinafter) were mixed and dissolved, to give 100 parts of a first layer coating solution (I-1).

Referential Example 50

98 Parts of the acrylic resin solution (h-2) and 2 parts of 2-(2'-hydroxy-3'-t-butyl-5'-methylphenyl)-5-chlorobenzotriazole (to be referred to as "UV-2" hereinafter) were mixed and dissolved, to give 100 parts of a first layer coating solution (I-2).

Referential Example 51

84.3 Parts of the acrylic resin solution (h-3), 12 parts of the siloxane resin solution (i-2), 1.7 parts of the melamine resin formulation (j-1) and 2 parts of 2-(2'-hydroxy-3'-t-butyl-5'-methylphenyl)-5-chlorobenzotriazole (to be referred to as "UV-3" hereinafter) were mixed and dissolved to give 100 parts of a first layer coating solution (I-3).

Referential Examples 52–71

First layer coating solutions (I-4) to (I-23) having compositions shown in Table 5 were prepared in the same manner as in Referential Example 49 or 51. Table 5 shows the respective compositions.

TABLE 5

| First layer coating solution | Acrylic resin solution Type | Amount (part) | Organosiloxane resin solution Type | Amount (part) | Melamine resin formulation Type | Amount (part) | Ultraviolet absorbent Type | Amount (part) | Total amount (part) |
|---|---|---|---|---|---|---|---|---|---|
| (I-1) | (h-1) | 99.0 | | | | | UV-1 | 1.0 | 100.0 |
| (I-2) | (h-2) | 98.0 | | | | | UV-2 | 2.0 | 100.0 |
| (I-3) | (h-3) | 84.3 | (i-1) | 12 | j-1 | 1.7 | UV-3 | 2.0 | 100.0 |
| (I-4) | (h-4) | 76.9 | (i-2) | 20 | j-3 | 1.1 | UV-1 | 2.0 | 100.0 |
| (I-5) | (h-5) | 79.0 | (i-3) | 20 | | | UV-1 | 1.0 | 100.0 |
| (I-6) | (h-6) | 87.0 | (i-2) | 10.5 | j-4 | 1 | UV-1 | 1.5 | 100.0 |
| (I-7) | (h-7) | 100.0 | | | | | | | 100.0 |
| (I-8) | (h-8) | 79.0 | (i-5) | 20 | j-1 | 1 | | | 100.0 |
| (I-9) | (h-9) | 83.4 | (i-2) | 15 | j-1 | 1.6 | | | 100.0 |
| (I-10) | (h-10) | 90.0 | (i-3) | 7.5 | j-1 | 1 | UV-1 | 1.5 | 100.0 |
| (I-11) | (h-11) | 90.6 | (i-2) | 7.5 | j-1 | 0.9 | UV-1 | 1.0 | 100.0 |
| (I-12) | (h-12) | 98.0 | | | | | UV-1 | 2.0 | 100.0 |
| (I-13) | (h-13) | 78.9 | (i-2) | 20 | j-1 | 1.1 | | | 100.0 |
| (I-14) | (h-14) | 99.0 | | | | | UV-4 | 1.0 | 100.0 |
| (I-15) | (h-15) | 100.0 | | | | | | | 100.0 |
| (I-16) | (h-16) | 100.0 | | | | | | | 100.0 |
| (I-17) | (h-17) | 89.9 | (i-1) | 9.2 | j-1 | 0.9 | | | 100.0 |
| (I-18) | (h-17) | 89.9 | (i-4) | 9.2 | j-2 | 0.9 | | | 100.0 |
| (I-19) | (h-18) | 85.6 | (i-4) | 14.4 | | | | | 100.0 |
| (I-20) | (h-19) | 83.0 | (i-2) | 15 | j-1 | 2 | | | 100.0 |
| (I-21) | (h-19) | 83.0 | (i-2) | 15 | j-1 | 1 | UV-1 | 1.0 | 100.0 |
| (I-22) | (h-20) | 99.0 | (i-2) | | | | UV-1 | 1.0 | 100.0 |
| (I-23) | (h-21) | 100.0 | | | | | | | 100.0 |

(Preparation of Second Layer Coating Solutions (II-1)—(II-14)

Referential Example 72

2 Parts of distilled water and 20 parts of acetic acid were added to 100 parts of a water-dispersible colloidal silica dispersion (Snowtex 30 (to be abbreviated as "S-30" hereinafter), supplied by Nissan Chemical Industries, Ltd., solid content 30% by weight), and the mixture was stirred. 130 Parts of methyltrimethoxysilane was added to the resultant dispersion with cooling in an ice water bath. The mixture was stirred at 25° C. for 1 hour, and 30 parts of the tetraethoxysilane hydrolysis condensate solution (Y) and 2 parts of sodium acetate as a curing catalyst were mixed with the reaction mixture at room temperature. The mixture was diluted with 200 parts of isopropanol to give 484 parts of a second layer coating solution (II-1). The coating solution had a pH of 5.0.

Referential Example 73

20 Parts of acetic acid was added to 100 parts of a water-dispersible colloidal silica dispersion (S-30), and the mixture was stirred. To the resultant dispersion was added 122 parts of methyltrimethoxysilane with cooling in an ice water bath. The mixture was stirred at 25° C. for 1 hour, and 50 parts of the tetraethoxysilane hydrolysis condensate solution (Y) and 1 part of potassium acetate as a curing catalyst were added to the resultant reaction mixture with cooling with ice. The mixture was diluted with 408 parts of isopropanol to give a second layer coating solution (II-2). The coating solution had a pH of 4.7.

Referential Example 74

12 Parts of distilled water and 20 parts of acetic acid were added to 100 parts of a water-dispersible colloidal silica dispersion (S-30), and the mixture was stirred. 130 Parts of methyltrimethoxysilane was added to the resultant dispersion with cooling in an ice water bath. The mixture was stirred at 25° C. for 1 hour, and 15.2 parts of tetramethoxysilane was added to the resultant reaction mixture. The mixture was stirred at 25° C. for 1 hour, then, 1 part of sodium acetate as a curing catalyst was mixed therewith at room temperature, and the mixture was diluted with 200 parts of isopropanol to give 478.2 parts of a second layer coating solution (II-3). The coating solution had a pH of 4.8.

Referential Examples 75–85

Second layer coating solutions (II-4) to (II-14) having compositions shown in Table 6 were prepared in the same manner as in Referential Example 72 or 74. Table 6 shows the respective compositions.

TABLE 6

| Second layer coating solution | S-30 | MTMOS | Y | TMOS | Acetic acid | Water | AcONa | AcOK | Nbu$_4$OH | IPA | pH of coating solution |
|---|---|---|---|---|---|---|---|---|---|---|---|
| (II-1) | 100 | 130 | 30 | | 20 | 2 | 2 | | | 200 | 5.0 |
| (II-2) | 100 | 122 | 50 | | 20 | | | 1 | | 408 | 4.7 |
| (II-3) | 100 | 130 | | 15.2 | 20 | 12 | 1 | | | 200 | 4.8 |
| (II-4) | 100 | 151.1 | 33.3 | | 11.1 | 10 | | 2.2 | | 188.9 | 5.4 |
| (II-5) | 100 | 134 | | 10.1 | 20 | 20 | 1 | | | 200 | 4.7 |
| (II-6) | 100 | 236.8 | 100 | | 50 | 60 | | | 3 | 50 | 4.8 |
| (II-7) | 100 | 139.2 | 42.8 | | 40 | 10 | 2 | | | 100 | 4.7 |
| (II-8) | 100 | 86.8 | 11.2 | | 10 | | | | 2 | 150 | 5.3 |
| (II-9) | 100 | 260.5 | 41.7 | | 60 | 60 | 4 | | | 50 | 4.9 |
| (II-10) | 100 | 134 | 20 | | 20 | 12 | 1 | | | 200 | 4.8 |
| (II-11) | 100 | 142 | | | 20 | 2 | 2 | | | 236 | 4.9 |
| (II-12) | | 146 | | 71 | 20 | 90 | 2 | | | 173 | 4.8 |
| (II-13) | 100 | 54.8 | 15 | | 10 | | 2 | | | 200 | 5.4 |
| (II-14) | 100 | 137 | 262.5 | | 20 | | 1 | | | 200 | 4.7 |

| Second layer Composition | Weight ratio | | |
|---|---|---|---|
| | Colloidal silica | Trialkoxysilane (as R$^2$SiO$_{3/2}$) | Tetraalkoxysilane (as SiO$_2$) |
| (II-1) | 30 | 64 | 6 |
| (II-2) | 30 | 60 | 10 |
| (II-3) | 30 | 64 | 6 |
| (II-4) | 27 | 67 | 6 |
| (II-5) | 30 | 66 | 4 |
| (II-6) | 18 | 70 | 12 |
| (II-7) | 28 | 64 | 8 |
| (II-8) | 40 | 57 | 3 |
| (II-9) | 18 | 77 | 5 |
| (II-10) | 30 | 66 | 4 |
| (II-11) | 30 | 70 | |
| (II-12) | | 72 | 28 |
| (II-13) | 50 | 45 | 5 |
| (II-14) | 20 | 45 | 35 |

Example 1

The first layer coating solution (I-1) was applied onto a 0.5 mm thick transparent sheet made of a polycarbonate resin (to be abbreviated as "PC resins" hereinafter) with a wire bar (bar coating method), and the applied coating solution was left at 25° C. for 20 minutes and then thermally cured at 120° C. for 20 minutes. The first layer had a thickness of 2.0 μm. Then, the second layer coating solution (II-1) was applied onto the coating surface of the sheet with a wire bar, and the applied coating solution was left at 25° C. for 20 minutes and then thermally cured at 120° C. for 1 hour. The second layer had a thickness of 5.0 μm. Table 7 shows results of evaluation of the resultant PC resin composite material.

Example 2

A 0.5 mm thick transparent sheet made of a PC resin was vertically suspended, and the first layer coating solution (I-2) was applied by flowing it from an upper portion of the sheet with a nozzle. The applied coating solution was left at 25° C. for 20 minutes and then thermally cured at 120° C. for 30 minutes. The first layer had a thickness of 3.0 μm. Then, the second layer coating solution (II-2) was applied on the coating surface of the sheet in the same manner as in the formation of the first layer, and the applied coating solution was left at 25° C. for 20 minutes and then thermally cured at 120° C. for 2 hours. The second layer had a thickness of 3.5 μm. Table 7 shows results of evaluation of the resultant PC resin composite material.

Example 3

A dip coating vessel having the form of a rectangular parallelepiped was filled with the first layer coating solution (I-3), and a 0.5 mm thick transparent sheet made of a PC resin was pre-dipped in the coating solution, lifted up at a constant rate and left at 25° C. for 30 minutes, followed by thermal curing at 120° C. for 40 minutes. The first layer had a thickness of 4.0 μm. Then, the second layer coating solution (II-3) was applied onto the coating surface of the sheet in the same manner as in the formation of the first layer, and the applied coating solution was left at 25° C. for 20 minutes and then thermally cured at 110° C. for 2 hours. The second layer had a thickness of 6.0 μm. Table 7 shows results of evaluation of the resultant PC resin composite material.

Examples 4–24

Comparative Examples 1–5

PC resin composite materials were prepared by carrying out application and thermally curing treatments in the same manner as in Example 3. The PC resin composite materials were evaluated for performances, and Table 7 shows the results.

TABLE 7

| | First layer coating solution | Thickness of first layer (μm) | Second layer coating solution | Thickness of second layer (μm) | Appearance | Initial haze | Abrasion resistance |
|---|---|---|---|---|---|---|---|
| Ex.1 | (I-1) | 2.0 | (II-1) | 5.0 | Excellent | 0.1 | 1.8 |
| Ex.2 | (I-2) | 3.0 | (II-2) | 3.5 | Excellent | 0.1 | 1.6 |
| Ex.3 | (I-3) | 4.0 | (II-3) | 6.0 | Excellent | 0.1 | 1.8 |
| Ex.4 | (I-4) | 3.5 | (II-4) | 4.0 | Excellent | 0.1 | 1.8 |
| Ex.5 | (I-5) | 3.0 | (II-5) | 6.0 | Excellent | 0.1 | 1.9 |
| Ex.6 | (I-6) | 2.0 | (II-6) | 5.0 | Excellent | 0.1 | 1.9 |
| Ex.7 | (I-7) | 5.0 | (II-7) | 4.0 | Excellent | 0.1 | 1.7 |
| Ex.8 | (I-8) | 6.0 | (II-1) | 5.0 | Excellent | 0.2 | 1.8 |
| Ex.9 | (I-9) | 5.0 | (II-1) | 4.0 | Excellent | 0.1 | 1.8 |
| Ex.10 | (I-10) | 5.0 | (II-1) | 4.0 | Excellent | 0.1 | 1.8 |
| Ex.11 | (I-11) | 5.0 | (II-1) | 5.0 | Excellent | 0.1 | 1.8 |
| Ex.12 | (I-12) | 5.0 | (II-1) | 4.0 | Excellent | 0.1 | 1.8 |
| Ex.13 | (I-1) | 2.0 | (II-1) | 5.0 | Excellent | 0.1 | 2.1 |
| Ex.14 | (I-5) | 3.0 | (II-8) | 4.0 | Excellent | 0.1 | 2.1 |
| Ex.15 | (I-13) | 4.0 | (II-8) | 4.0 | Excellent | 0.1 | 2.1 |
| Ex.16 | (I-14) | 4.0 | (II-9) | 5.0 | Excellent | 0.1 | 1.8 |
| Ex.17 | (I-15) | 2.5 | (II-1) | 5.0 | Excellent | 0.1 | 1.8 |
| Ex.18 | (I-16) | 3.0 | (II-2) | 3.5 | Excellent | 0.1 | 1.6 |
| Ex.19 | (I-17) | 2.5 | (II-10) | 5.0 | Excellent | 0.1 | 1.9 |
| Ex.20 | (I-18) | 2.5 | (II-10) | 5.0 | Excellent | 0.1 | 1.9 |
| Ex.21 | (I-20) | 3.0 | (II-1) | 5.0 | Excellent | 0.1 | 1.8 |
| Ex.22 | (I-21) | 3.0 | (II-1) | 5.0 | Excellent | 0.1 | 1.8 |
| Ex.23 | (I-22) | 3.0 | (II-1) | 5.0 | Excellent | 0.1 | 1.8 |
| Ex.24 | (I-19) | 4.0 | (II-4) | 7.0 | Excellent | 0.3 | 1.8 |
| C.Ex.1 | (I-18) | 3.0 | (II-11) | 5.0 | Excellent | 0.1 | 2.9 |
| C.Ex.2 | (I-18) | 3.0 | (II-12) | 5.0 | Excellent | 0.1 | 4.7 |
| C.Ex.3 | (I-18) | 3.0 | (II-13) | 3.5 | Excellent | 0.3 | 2.5 |
| C.Ex.4 | (I-18) | 3.0 | (II-14) | 3.5 | Cracking | | |
| C.Ex.5 | (I-23) | 3.0 | (II-1) | 5.0 | Excellent | 0.2 | |

| | Boiling water immersion test | | | Weatherability test | | | | |
|---|---|---|---|---|---|---|---|---|
| | Adhesion | | | Adhesion | | | Adhesion | |
| | First time | Third time | Appearance | First time | Third time | Appearance | First time | Third time | ΔYI |
| Ex.1 | 100 | 100 | Excellent | | | Excellent | 100 | 100 | 0.2 |
| Ex.2 | 100 | 100 | Excellent | 100 | 100 | Excellent | 100 | 100 | 0.3 |
| Ex.3 | 100 | 100 | Excellent | 100 | 100 | Excellent | 100 | 100 | 0.2 |
| Ex.4 | 100 | 100 | Excellent | 100 | 100 | Excellent | 100 | 100 | 0.3 |
| Ex.5 | 100 | 100 | Excellent | 100 | 100 | Excellent | 100 | 100 | 0.2 |
| Ex.6 | 100 | 100 | Excellent | 100 | 100 | Excellent | 100 | 100 | 0.3 |
| Ex.7 | 100 | 100 | Excellent | 100 | 100 | Excellent | 100 | 100 | 0.2 |
| Ex.8 | 100 | 100 | Excellent | 100 | 100 | Excellent | 100 | 100 | 0.3 |
| Ex.9 | 100 | 100 | Excellent | 100 | 100 | Excellent | 100 | 100 | 0.4 |
| Ex.10 | 100 | 100 | Excellent | 100 | 100 | Excellent | 100 | 100 | 0.3 |
| Ex.11 | 100 | 100 | Excellent | 100 | 100 | Excellent | 100 | 100 | 0.3 |
| Ex.12 | 100 | 100 | Excellent | 100 | 100 | Excellent | 100 | 100 | 0.1 |
| Ex.13 | 100 | 100 | Excellent | 100 | 100 | Excellent | 100 | 100 | 0.3 |
| Ex.14 | 100 | 100 | Excellent | 100 | 50 | Excellent | 100 | 100 | 0.2 |
| Ex.15 | 100 | 100 | Excellent | 100 | 100 | Excellent | 100 | 100 | 0.3 |
| Ex.16 | 100 | 100 | Excellent | 100 | 100 | Yellowing | 100 | 100 | 3.8 |
| Ex.17 | 100 | 100 | Excellent | 100 | 100 | Yellowing | 100 | 50 | 16.8 |
| Ex.18 | 100 | 100 | Excellent | 100 | 100 | Yellowing | 100 | 20 | 17.5 |
| Ex.19 | 100 | 100 | Excellent | 100 | 80 | Yellowing | 100 | 100 | 18.5 |
| Ex.20 | 100 | 100 | Excellent | 100 | 100 | Yellowing | 100 | 80 | 19.6 |
| Ex.21 | 100 | 100 | Excellent | 100 | 80 | Excellent | 100 | 100 | 0.5 |
| Ex.22 | 100 | 100 | Excellent | 100 | 20 | Excellent | 100 | 100 | 0.2 |
| Ex.23 | 100 | 100 | Excellent | 100 | 20 | Excellent | 100 | 100 | 0.3 |
| Ex.24 | 100 | 100 | Excellent | 100 | 80 | Yellowing | 100 | 50 | 20.8 |
| C.Ex.1 | 100 | 100 | Excellent | 100 | 100 | Yellowing | 100 | 50 | 21.3 |
| C.Ex.2 | 100 | 100 | Excellent | 100 | 100 | Yellowing | 100 | 20 | 16.5 |
| C.Ex.3 | 100 | 100 | Cracking | | | Yellowing | 100 | 0 | 18.4 |
| C.Ex.4 | | | | | | | | | |
| C.Ex.5 | 20 | 0 | Excellent | 0 | | Peeling of layer | | | |

Ex.: Example
C.Ex.: Comparative Example

In Tables 1 to 7, abbreviations mean as follows.
MTMOS: Methyltrimethoxysilane
TEOS: Tetraethoxysilane
TMOS: Tetramethoxysilane
S-30: Water-dispersible colloidal silica dispersion (Snowtex 30, supplied by Nissan Chemical Industries, Ltd., solid content 30% by weight, average particle diameter 20 nm)
UV-1: 2-(2'-hydroxy-5'-t-octylphenyl)benzotriazole
UV-2: 2-(2'-hydroxy-3'-t-butyl-5'-methylphenyl)-5-chlorobenzotriazole
UV-3: 2-(2'-hydroxy-3',5'-dl-t-butylphenyl)-5-chlorobenzotriazole
UV-4: 2–4-dihydroxybenzophenone
MMA: Methyl methacrylate
EMA: Ethyl methacrylate
MEBT: 2-(2'-hydroxy-5'-methacryloxyethylphenyl)-benzotriazole,
MEBP: 2-hydroxy-4-methacryloxyethylbenzophenone
HEMA: 2-hydroxyethyl methacrylate
MPTMS: 3-methacryloxypropyltrimethoxysilane
MEK: 2-butanone
MIBK: 4-methyl-2-pentanone
2-BuOH: 2-butanol
IPA: Isopropanol
EtOH: Ethanol
EGE: 2-ethoxyethanol
PHA: 1-methoxy-2-propanol
AcONa: Sodium acetate
AcOK: Potassium acetate
NBU$_4$OH: Tetrabutylammonium hydroxide
p-TSA: p-toluenesulfonic acid

What is claimed is:

1. A surface-protected plastic composite material comprising a transparent plastic, a coating layer (I) as a first layer stacked on the transparent plastic substrate and a thermally cured coating layer (II) as a second layer stacked on the first layer, the coating layer (I) being formed of a resin composition containing at least 50% by weight, based on the resin content thereof, of an acrylic resin which is an acrylic resin containing at least 50 mol % of recurring unit of the following formula (I-a),

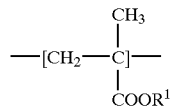
(I-a)

wherein R$^1$ is an alkyl group having 1 to 4 carbon atoms, the thermally cured coating layer (II) being made of an organosiloxane resin formed from the following components a, b and c, (A) colloidal silica (component a),
(B) a hydrolysis condensate (component b) of a trialkoxysilane of the following formula (II-1), R$^2$Si(OR$^3$)$_3$ (II-1), wherein R$^2$ is an alkyl group having 1 to 4 carbon atoms, a vinyl group or an alkyl group which has 1 to 3 carbon atoms and is substituted with at least one group selected from the group consisting of methacryloxy, amino, glycidoxy and 3,4-epoxycyclohexyl and R$^3$ is an alkyl group having 1 to 4 carbon atoms, wherein, methyltrialkoxysilane consitutes at least 70% by weight of the entire trialkoxysilanes, and (C) a hydrolysis condensate (component c) of a tetraalkoxysilane of the following formula (II-2), Si(OR$^4$)$_4$ (II-2)

wherein R$^4$ is an alkyl group having 1 to 4 carbon atoms, the organosiloxane resin containing 5 to 45% by weight of the component a, 50 to 80% by weight, as R$^2$SiO$_{3/2}$, of the component b and 2 to 30% by weight, as SiO$_2$, of the component c.

2. The transparent plastic composite material of claim 1, wherein the acrylic resin of the coating layer (I) is an acrylic copolymer resin having recurring units of the said formula (I-a) and the following formula (I-b) and/or the following formula (I-c),

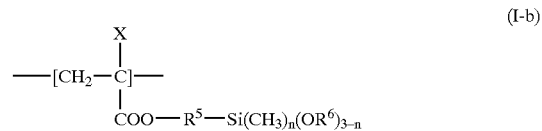
(I-b)

in which X is a hydrogen atom or methyl, R$^5$ is an alkylene group having 2 to 5 carbon atoms, R$^6$ is an alkyl group having 1 to 4 carbon atoms and n is an integer of 0 or 1,

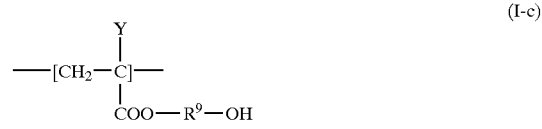
(I-c)

in which Y is a hydrogen atom or methyl and R$^9$ is an alkylene group having 2 to 5 carbon atoms, and further wherein the acrylic copolymer resin has a (I-a):[(I-b)+(I-c)] molar ratio of the units in the range of from 99.5:0.5 to 50:50.

3. The transparent plastic composite material of claim 2, wherein the coating layer (I) is formed of a mixture of the acrylic resin with a hydrolysis condensate of a compound of the following formulae (I-e), R$^7_r$-Si(OR$^8$)$_{4-r}$ (I-e)

wherein R$^7$ is an alkyl group having 1 to 4 carbon atoms, a vinyl group or an alkyl group which is substituted with one or more groups selected from the group constituting of methacryloxy, amino, glycidoxy and 3,4-epoxycyclohexyl and has 1 to 3 carbon atoms, R$^8$ is an alkyl group having 1 to 4 carbon atoms, and r is an integer of 0 to 2, the mixture having an acrylic resin: hydrolysis condensate (as R$^7_r$—SiO$_{4-r/2}$) amount ratio by weight in the range of from 99:1 to 60:40.

4. The transparent plastic composite material of claim 3, wherein the coating layer (I) further contains a melamine resin in the range of from 1 to 20 parts by weight per 100 parts by weight of the total of the acrylic resin and the hydrolysis condensate of the compound of the formula (I-e).

5. The transparent plastic composite material of claim 3, wherein the coating layer (I) further contains 0.7 to 100 parts by weight, per 100 parts by weight of the acrylic resin, of an ultraviolet absorbent.

6. The transparent plastic composite material of claim 5, wherein the ultraviolet absorbent has a solubility of 1.5 g/L or less in a solvent mixture containing 100 parts by weight of isopropanol, 30 parts by weight of methanol and 15 parts by weight of water when measured at 25° C.

7. The transparent plastic composite material of claim 2, wherein the acrylic copolymer resin is an acrylic copolymer resin containing 0.3 to 40 mol %, based on the total units of the above formulae (I-a) and [(I-b)+(I-c)], of units of the following formula (I-d),

wherein Z is a hydrogen atom or methyl, $R^{10}$ is an alkylene group having 2 to 5 carbon atoms and W is an ultraviolet absorbent residue.

8. The transparent plastic composite material of claim 7, wherein the coating layer (I) is formed of a mixture of the acrylic resin with a hydrolysis condensate of a compound of the following formula (I-e),

wherein $R^7$ is an alkyl group having 1 to 4 carbon atoms, a vinyl group or an alkyl group which is substituted with one or more groups selected from the group consisting of methacryloxy, amino, glycidoxy and 3,4-epoxycyclohexyl and has 1 to 3 carbon atoms, $R^8$ is an alkyl group having 1 to 4 carbon atoms, and r is an integer of 0 to 2, the mixture having an acrylic resin: hydrolysis condensate (as $R^7_r$—$SiO_{4-r/2}$) amount ratio by weight in the range of from 99:1 to 60:40.

9. The transparent plastic composite material of claim 8, wherein the coating layer (I) further contains a melamine resin in the range of from 1 to 20 parts by weight per 100 parts by weight of the total of the acrylic resin and the hydrolysis condensate of the compound of the formula (I-e).

10. The transparent plastic composite material of claim 8, wherein the coating layer (I) further contains 0.7 to 100 parts by weight, per 100 parts by weight of the acrylic resin, of an ultraviolet absorbent.

11. The transparent plastic composite material of claim 10, wherein the ultraviolet absorbent has a solubility of 1.5 g/L or less in a solvent mixture containing 100 parts by weight of isopropanol, 30 parts by weight of methanol and 15 parts by weight of water when measured at 25° C.

12. The transparent plastic composite material of claim 1, wherein the coating layer (I) is formed of a mixture of the acrylic resin with a hydrolysis condensate of a compound of the following formula (I-e),

wherein $R^7$ is an alkyl group having 1 to 4 carbon atoms, a vinyl groups or an alkyl group which is substituted with one or more groups selected from the group consisting of methacryloxy, amino, glycidoxy and 3,4-epoxycyclohexyl and has 1 to 3 carbon atoms, $R^8$ is an alkyl group having 1–4 carbon atoms, and r is an integer of 0 to 2, the mixture having an acrylic resin: hydrolysis condensate (as $R^7_r$—$SiO_{4-r/2}$) amount ratio by weight in the range of from 99:1 to 60:40.

13. The transparent plastic composite material of claim 12, wherein the coating layer (I) further contains a melamine resin in the range of from 1 to 20 parts by weight per 100 parts by weight of the total of the acrylic resin and the hydrolysis condensate of the compound of the formula (I-e).

14. The transparent plastic composite material of claim 1, wherein the coating layer (I) further contains 0.7 to 100 parts by weight, per 100 parts by weight of the acrylic resin, of an ultraviolet absorbent.

15. The transparent plastic composite material of claim 14, wherein the ultraviolet absorbent has a solubility of 1.5 g/L or less in a solvent mixture containing 100 parts by weight of isopropanol, 30 parts by weight of methanol and 15 parts by weight of water when measured at 25° C.

16. The transparent plastic composite material of claim 1, wherein the coating layer (11) is a thermally cured layer of a resin composition containing 15 to 35% by weight of the component a, 55 to 75% by weight, as $R^2SiO_31$, of the component b and 3 to 20% by weight, as $SiO_2$, of the component c.

17. The transparent plastic composite material of claim 1, wherein:

(1) the coating layer (I) is formed of a resin composition containing an acrylic copolymer resin which is formed of recurring units of the following formulae (I-a) and (I-b),

wherein $R^1$ is as defined in the foregoing formula (I-a),

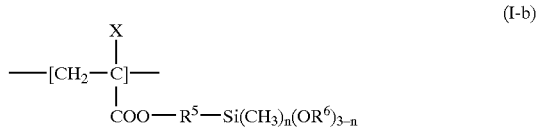

in which X is a hydrogen atom or methyl, $R^5$ is an alkylene group having 2 to 5 carbon atoms, $R^6$ is an alkyl group having 1 to 4 carbon atoms and n is an integer of 0 or I, and which has a (I-a):(I-b) unit ratio in the range of from 97:3 to 70:30 and 3 to 60 parts by weight, per 100 parts by weight of the acrylic copolymer resin, of an ultraviolet absorbent, the ultraviolet absorbent having a solubility of 1.5 g/L or less in a solvent mixture containing 100 parts by weight of isopropanol, 30 parts by weight of methanol and 15 parts by weight of water when measured at 25° C., and (2) the coating layer (I) is a thermally cured layer of a resin composition containing 15 to 35% by weight of the component a, 55 to 75% by weight, as $R^2SiO_{3/2}$, of the component b and 3 to 20% by weight, as $SiO_2$, of the component c.

18. The transparent plastic composite material of claim 1, wherein:

(I) the coating layer (I) is formed of a resin composition containing an acrylic copolymer resin which is formed of recurring units of the following formulae (I-a), (I-b) and (I-d),

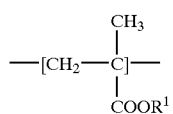 (I-a)

wherein $R^1$ is as defined in the foregoing formula (I-a),

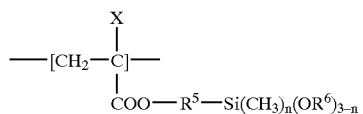 (I-b)

in which X is a hydrogen atom or methyl, $R^5$ is an alkylene group having 2 to 5 carbon atoms, $R^6$ is an alkyl group having 1 to 4 carbon atoms and n is an integer of 0 or 1,

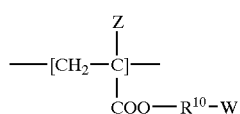 (I-d)

wherein Z is a hydrogen atom or methyl, $R^{10}$ is an alkylene group having 2 to 5 carbon atoms and W is an ultraviolet absorbent residue, and which has a (I-a):(I-b):(I-d) unit ratio in the range of from 96.7–60:3–30:0.3–15 and 3 to 60 parts by weight, per 100 parts by weight of the acrylic copolymer resin, of an ultraviolet absorbent, the ultraviolet absorbent having a solubility of 1.5 g/L or less in a solvent mixture containing 100 parts by weight of isopropanol, 30 parts by weight of methanol and 15 parts by weight of water when measured at 25° C., and (2) the coating layer (II) is a thermally cured layer of a resin composition containing 15 to 35% by weight of the component a, 55 to 75% by weight, as $R^2SiO_{3/2}$, of the component b and 3 to 20% by weight, as $SiO_2$, of the component c.

19. The transparent plastic composite material of claim 1, wherein:

(I) the coating layer (I) is formed of a resin composition containing 100 parts by weight of an acrylic copolymer resin which is formed of recurring units of the following formulae (I-a) and (I-c),

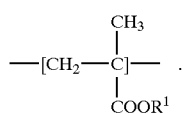 (I-a)

wherein $R^1$ is as defined in the foregoing formula (I-a),

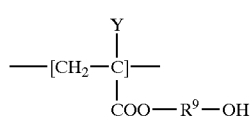 (I-c)

in which Y is a hydrogen atom or methyl and $R^9$ is an alkylene group having 2 to 5 carbon atoms, and which has a (I-a):(I-c) unit ratio in the range of from 95:5 to 60:40, a mixture (as $R^7_rSiO_{4-r/2}$) of hydrolysis condensates of a compound of the formula (I-e),

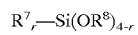 (I-e)

wherein $R^7$ is an alkyl group having 1 to 4 carbon atoms, a vinyl group or an alkyl group which is substituted with one or more groups selected from the class consisting of methacryloxy, amino, glycidoxy and 3,4-epoxycyclohexyl and has 1 to 3 carbon atoms, $R^8$ is an alkyl group having 1 to 4 carbon atoms, and r is an integer of 0 to 2, the mixture having such an amount that the ratio of the acrylic copolymer resin: the hydrolysis condensates comes to be 99:1 to 60:40 by weight, a melamine resin in such an amount that the amount thereof per 100 parts by weight of the total of the acrylic copolymer resin and the hydrolysis condensates comes to be 3 to 15 parts by weight, and 3 to 60 parts by weight, per 100 parts by weight of the acrylic copolymer resin, of an ultraviolet absorbent, the ultraviolet absorbent having a solubility of 1.5 g/L or less in a solvent mixture containing 100 parts by weight of isopropanol, 30 parts by weight of methanol and 15 parts by weight of water when measured at 25° C., and (2) the coating layer (11) is a thermally cured layer of a resin composition containing 15 to 35% by weight of the component a, 55 to 75% by weight, as $R_2SiO_{3/2}$, of the component b and 3 to 20% by weight, as $SiO_2$, of the component c.

20. The transparent plastic composite material of claim 1, wherein:

(1) the coating layer (I) is formed of a resin composition containing 100 parts by weight of an acrylic copolymer resin which is formed of recurring units of the following formulae (I-a), (I-c) and (I-d),

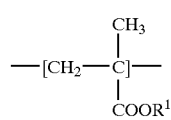 (I-a)

wherein $R^1$ is as defined in the foregoing formula (I-a),

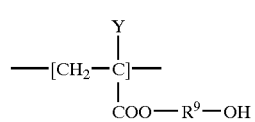 (I-c)

in which Y is a hydrogen atom or methyl and $R^9$ is an alkylene group having 2 to 5 carbon atoms,

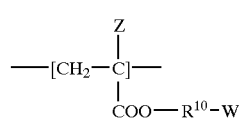 (I-d)

wherein Z is a hydrogen atom or methyl, $R^{10}$ is an alkylene group having 2 to 5 carbon atoms and W is an ultraviolet absorbent residue, and which has a (I-a):(I-c):(I-d) unit ratio un the range of from 94.7–50:5–40:0.3–15, a mixture (as $R^7_r$—$SiO_{4-r/2}$) of hydrolysis condensates of a compound of the formula (I-e),

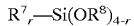
$$R^7_r\text{—}Si(OR^8)_{4-r} \qquad \text{(I-e)}$$

wherein $R^7$ is an alkyl group having 1 to 4 carbon atoms, a vinyl group or an alkyl group which is substituted with one or more groups selected from the group consisting of methacryloxy, amino, glycidoxy and 3,4-epoxycyclohexyl and has 1 to 3 carbon atoms, $R^8$ is an alkyl group having 1 to 4 carbon atoms, and r is an integer of 0 to 2, the mixture having such an amount that the ratio of the acrylic copolymer resin: the hydrolysis condensates comes to be 99:1 to 60:40 by weight, a melamine resin in such an amount that the amount thereof per 100 parts by weight of the total of the acrylic copolymer resin and the hydrolysis condensates comes to be 3 to 15 parts by weight, and 3 to 60 parts by weight, per 100 parts by weight of the acrylic copolymer resin, of an ultraviolet absorbent, the ultraviolet absorbent having a solubility of 1.5 g/L or less in a solvent mixture containing 100 parts by weight of methanol and 15 parts by weight of water when measured at 25° C, and (2) the coating layer (11) is a thermally cured layer of a resin composition containing 15 to 35% by weight of the component a, 55 to 75% by weight, as $R^2SiO_{3/2}$, of the component b and 3 to 20% by weight, as $SiO_2$, of the component c.

21. The transparent plastic composite material of claim 1, wherein the transparent plastic substrate is made of an aromatic polycarbonate resin.

22. The transparent plastic composite material of claim 1, which has a thickness in the range of from 0.001 to 10 mm.

23. The transparent plastic composite material of claim 1, wherein, when subjected to a 1,000-rotation Taber abrasion test (ASTM D 1044) using a CS-10F abrasion wheel supplied by Calibrase under a load of 500 g, the transparent plastic composite material shows a change of 2% or less between its haze values before and after the test.

24. The transparent plastic composite material of claim 1, which substantially does not show any occurrence of cracking on the surface thereof after maintained in boiling water for 3 hours.

25. An organic window glass made of the transparent plastic composite material recited in claim 1.

26. An organic window glass for a car or an aircraft, which is made of the transparent plastic composite material recited in claim 1.

* * * * *